United States Patent
Honjo et al.

(10) Patent No.: US 7,023,659 B2
(45) Date of Patent: Apr. 4, 2006

(54) MAGNETIC HEAD HAVING AN ANTISTRIPPING LAYER FOR PREVENTING A MAGNETIC LAYER FROM STRIPPING

(75) Inventors: Hiroaki Honjo, Tokyo (JP); Tsutomu Ishi, Tokyo (JP); Mikiko Saito, Tokyo (JP); Shinsaku Saito, Tokyo (JP); Tamaki Toba, Tokyo (JP); Yoshihiro Nonaka, Tokyo (JP); Kazuhiko Hayashi, Tokyo (JP); Nobuyuki Ishiwata, Tokyo (JP)

(73) Assignee: NEC Corporation, Tokyo (JP)

( * ) Notice: Subject to any disclaimer, the term of this patent is extended or adjusted under 35 U.S.C. 154(b) by 32 days.

(21) Appl. No.: 10/815,069

(22) Filed: Mar. 31, 2004

(65) Prior Publication Data

US 2004/0190198 A1   Sep. 30, 2004

Related U.S. Application Data

(60) Division of application No. 10/113,608, filed on Apr. 1, 2002, now Pat. No. 6,791,794, which is a continuation-in-part of application No. 09/672,597, filed on Sep. 28, 2000, now abandoned.

(30) Foreign Application Priority Data

| Sep. 30, 1999 | (JP) | ................. 11-278567 |
| May 18, 2000 | (JP) | ............................ 2000-145875 |
| Sep. 21, 2000 | (JP) | ............................ 2000-286809 |

(51) Int. Cl.
*G11B 5/147* (2006.01)

(52) U.S. Cl. .................................. 360/126

(58) Field of Classification Search ............... 360/126, 360/125, 317–320; 29/603.14; 428/692
See application file for complete search history.

(56) References Cited

U.S. PATENT DOCUMENTS

| 4,661,216 A | 4/1987 | Anderson et al. |
| 5,311,387 A * | 5/1994 | Mallary ..................... 360/126 |
| 5,438,747 A | 8/1995 | Krounbi et al. |
| 5,606,478 A | 2/1997 | Chen et al. |
| 5,812,350 A | 9/1998 | Chen et al. |
| 5,850,325 A | 12/1998 | Miyauchi et al. |
| 5,864,450 A | 1/1999 | Chen et al. |
| 5,966,277 A | 10/1999 | Koshikawa et al. |
| 5,989,728 A | 11/1999 | Coffey et al. |
| 6,132,892 A | 10/2000 | Yoshikawa et al. |
| 6,296,955 B1 * | 10/2001 | Hossain et al. ............. 428/692 |
| 6,301,075 B1 | 10/2001 | Sato |
| 6,342,311 B1 * | 1/2002 | Inturi et al. ................. 428/692 |

(Continued)

FOREIGN PATENT DOCUMENTS

JP          50-95147          7/1975

(Continued)

*Primary Examiner*—Angel Castro
(74) *Attorney, Agent, or Firm*—Katten Muchin Rosenman LLP

(57) ABSTRACT

By inserting a first antistripping layer comprising a first non-magnetic layer 22 and a first conductive layer 23 between a first magnetic layer 16 and a magnetic separation layer 13, adhesion between the first conductive layer 23 and the magnetic separation layer 13 is improved to prevent the first magnetic layer 16 from stripping. In addition, by inserting a second antistripping layer comprising a second non-magnetic layer 24 and a second conductive layer 25 between a second magnetic layer 21 and a magnetic gap layer 17, adhesion between the second conductive layer 24 and the magnetic gap layer 17 is improved to prevent the second magnetic layer 25 from stripping.

31 Claims, 10 Drawing Sheets

U.S. PATENT DOCUMENTS

| | | |
|---|---|---|
| 6,445,537 B1 | 9/2002 | Cates |
| 6,466,416 B1 | 10/2002 | Honjo et al. |
| 6,473,960 B1 | 11/2002 | Schwartz et al. |
| 6,507,457 B1 * | 1/2003 | He et al. .................... 360/126 |
| 6,538,845 B1 * | 3/2003 | Watanabe et al. ........... 360/126 |
| 6,562,487 B1 | 5/2003 | Vas'ko et al. |

FOREIGN PATENT DOCUMENTS

| | | |
|---|---|---|
| JP | 61-246908 | 11/1986 |
| JP | 63-079305 | 4/1988 |
| JP | 06-346202 | 12/1994 |
| JP | 07-003489 | 1/1995 |
| JP | 07-235017 | 9/1995 |
| JP | 07-254120 | 10/1995 |
| JP | 08-212512 | 8/1996 |
| JP | 08-321010 | 12/1996 |
| JP | 09-138930 | 5/1997 |
| JP | 10-162322 | 6/1998 |
| JP | 10-241125 | 9/1998 |
| JP | 11-016120 | 1/1999 |
| JP | 11-025420 | 1/1999 |

* cited by examiner

MAGNETIC HEAD HAVING AN ANTISTRIPPING LAYER FOR PREVENTING A MAGNETIC LAYER FROM STRIPPING

CROSS-REFERENCES TO RELATED APPLICATION

This is a Divisional Application of U.S. application Ser. No. 10/113,608, filed on Apr. 1, 2002, now U.S. Pat. No. 6,791,794 which is a continuation-in-part application of U.S. application Ser. No. 09/672,597, filed on Sep. 28, 2000, now abandoned.

BACKGROUND OF THE INVENTION

This invention relates to a magnetic head for recording information on a magnetic recording medium, to a method of manufacturing the magnetic head, and to a magnetic storage unit using the magnetic head.

A magnetic recording medium is disclosed, for example, in Japanese Unexamined Patent Publication of Tokka: No. Hei 9-138,930 (or JP-A 9-138930). JP-A 9-138930 provides a magnetic recording medium to obtain high magnetic characteristics and to improve adhesion property between a substrate and a base layer. According to JP-A 9-138930, first base layers, second base layers, magnetic layers and lubricant layers are successively formed on a substrate. Among the base layers, the first base layers formed near the substrate have higher specific heat than that of the second base layers deposited far from the substrate. Thereby, the temperature in orientation controlling layers and magnetic layers can be enough raised without increasing the temperature in the inside and surface of the substrate so much. Thereby, adhesion property between the first base layers and the substrate can be improved, which prevents peeling of the first base layers.

The magnetic storage units may be a magnetic disk drive. In the magnetic disk drive, data is written and read by thin film magnetic transducers called "magnetic heads" which are supported over a surface of the magnetic recording medium or disk while it is rotated at a high speed. The magnetic head are supported by a thin cushion of air (an "air bearing") produced by the disk's high rotational speed.

With miniaturization and large-capacity in the magnetic storage unit, a volume per one bit recorded on the magnetic recording medium drastically becomes small. In the manner which is well known in the art, there is a magnetoresistive (MR) head to detect, as a large read output, a magnetic signal generated from a microscopic bit.

Inasmuch as the MR head is exclusively used for reading, the MR head is used as a merged MR head which employs the MR head and an inductive (ID) head for writing in combination. Such as a merged MR head is disclosed, for example, in U.S. Pat. No. 5,438,747, Japanese Unexamined Patent Publication of Tokkai No. Hei 8-212,512 (or JP-A 8-212512), and Japanese Granted Patent Publication of No. 2,821,456 (or JP-B 2821456) which corresponds to U.S. patent application Ser. No. 09/108,252).

U.S. Pat. No. 5,439,747 provides a merged MR head having vertically aligned sidewalls so as to minimize side-fringing and improve off-track performance. When a magnetic recording disk is rotated, a thin film merged MR head, mounted on a slider, is supported above a surface of the magnetic recording disk by a thin layer of air called an "air bearing". The merged MR head includes an MR read head and an IR write head. The bottom surface of the slider and the merged MR head are in the plane of an air bearing surface (ABS) of the slider. The MR read head includes a magnetoresistive element MR which is sandwiched between first and second gap layers, the gap layers in turn being sandwiched between first and second shield layers. The first and second gap layers are collectively called a magnetic separation layer. In a merged MR head, the second shield layer of the MR read head also serves as the bottom pole piece for the IR write head. The bottom pole piece is called a first or lower magnetic layer. The IR write head has a pole tip region which is located between the air bearing surface (ABS) and a zero throat level and a yoke or back region which extends back from the zero throat level to and including a back gap. The IR write head includes the bottom pole piece and a top pole piece. The top pole piece is called a second or upper magnetic layer. The bottom pole piece comprises the second shield layer of the MR read head. Each pole piece also has a back layer portion which is located in the back region, the back layer portions of the pole pieces being magnetically connected at the back gap (BG). The bottom pole piece includes a pole tip structure which is located in the pole tip region between the ABS and the zero throat level. This pole tip structure includes a bottom pole tip element and a top pole tip element. The top pole piece includes a pole tip structure which is located in the pole tip region between the ABS and the zero throat level. This pole tip structure includes a top pole tip element. The pole tip elements are integrally formed from second shield of the MR read head. A pole gap layer (G) is sandwiched between the pole tip elements.

JP-A 8-212512 discloses a magnetic head for a high recording density in a high-frequency region. Specifically, JP-A 8-212512 discloses a recording and reproducing separated type head which comprises an inductive (IR) write head, a magnetoresistive (MR) read head, and a shield member for preventing the MR read head from being confused due to a leakage magnetic field. The MR read head comprises a lower shield layer formed on a substrate, a magnetoresistance effect layer, electrodes, and an upper shield layer. The IR write head comprises a lower magnetic layer, a write coil, and an upper magnetic layer.

JP-B 2821456 discloses a merged MR head which comprises a MR read head and an IR write head. The IR write head comprises a lower magnetic layer, an insulating layer formed on the lower magnetic layer, a write coil enclosed with the insulating layer, and an upper magnetic layer formed on the insulating layer. The write coil is a patterned conductive layer. The MR read head comprises a lower shield layer, a gap layer formed on the lower shield layer, a magneto-resistance effect element sandwiched in the gap layer at one end thereof, an upper shield layer formed on the gap layer. The lower magnetic layer is the upper shield layer itself.

Recently, a giant magnetoresistive (GMR) read head is made practicable. The GMR read head uses a GMR effect which is capable of realizing a drastic high output in comparison with the MR read head. The GMR read head generally uses a spin valve effect. The "spin valve effect" is a phenomenon where a variation of resistance corresponds to a cosine between magnetic directions of two adjacent magnetic layers and thereby a large variation of resistance is obtained by a small operational magnetic field. Such a GMR read head using the spin valve effect is disclosed, for example, in Japanese Unexamined Patent Publications of Tokkai No. Hei 10-162,322 (or JP-A 10-162322) and Tokkai No. Hei 11-16,120 (or JP-A 11-16120).

JP-A 10-162322 provides a merged GMR head that realizes simultaneously the magnetizing direction of the magnetization fixing layer of a spin valve element and the magnetic anisotropic direction of a magnetic shield or a recording magnetic pole, and that can secure a stable operation of a magnetoresistence effect (MR) read head part and an indudtive (ID) write head part. The merged GMR head disclosed in JP-A 10-162,322 is equipped with an MR read head part having a reproducing function and an ID write head part recording prescribed information on a magnetic recording medium with a magnetic gap part. An MR element is constituted of a center area and end areas. The center area consists of spin valve elements and senses a media magnetic field. The end areas supply a bias magnetic field and an electric current. The other magnetic pole of the ID write head part is constituted of two kinds of laminated magnetic films having a different degree of saturation magnetization. The saturation magnetization of the magnetic film close to a magnetic gap inside each magnetic film is set to be larger than that of the magnetic film away from the magnetic gap.

JP-A 11-16120 provides a magnetic domain structure which may be optimized even without the execution of the head treatment. JP-A 11-16120 discloses a recording and reproducing separated-type head using a thin film magnetic head. The recording and reproducing separated-type head comprises a reproducing or read head and a recording or write head. The reproducing head comprises a magnetoresistence effect film which is sandwiched between first and second shield layers. In addition, the second shield layer serves as a lower magnetic pole of the recording head. The recording head comprises the lower magnetic pole, a shield layer sandwiching a coil, and an upper magnetic pole. The magnetoresistence effect film is a spin valve film.

The GMR read head is practically used at a high-density recording area having a recording density of 3 gigabits/inch$^2$ or more. At a recording area having a recording density less than 3 gigabits/inch$^2$, it is possible to sufficiently cover by a conventional MR head using magnetic anisotropy. That is, a practically significant GMR read head realizes a high-density recording and reproducing of 3 gigabits/inch$^2$ or more. Accordingly, a magnetic storage apparatus constructed using the GMR head is a high-density recording and reproducing apparatus of 3 gigabits/inch$^2$ or more.

On the other hand, in the ID write head carrying a recording function to a magnetic recording medium, an improvement of a high-density recording performance is always requested with development of the GMR read head. In particularly, a high coercive force to the magnetic recording medium is indispensable to carry out a high-density recording. This is to minimize a transition length of a magnetizing recorded in the magnetic recording medium with improvement of a recording density and to stably hold the magnetizing although a length of the magnetizing per one bit is shortened. For this purpose, development for the ID write head to enlarge a recording magnetic field is energetically advanced so as to record the magnetic recording medium of a high coercive force which is suitable for the high-density recording.

Now, with considerations of convenience and low cost in a manufacturing process of the magnetic head, it is effective that a magnetic material is formed by plating. In the plating, it is possible to obtain a desired pattern by forming a photo-resist frame where a shape of magnetic poles (first and second magnetic layers) is preliminarily bored and by growing a plating layer within the photo-resist frame. The first and the second magnetic layers are called lower and upper magnetic layers, respectively. Inasmuch as this method is convenience and low cost, this method presently becomes a standard manufacturing method of a thin-film magnetic head.

Various thin magnetic films suitable for magnetic layers are already known. By way of example, the above-mentioned JP-A 11-16120 discloses a two-layered film comprising a nickel-iron (NiFe) alloy as an essential element. The two-layered film consists of a first magnetic sub-layer having a high saturation magnetic flux density and a second magnetic sub-layer having a low magnetostriction constant. The first and the second magnetic sub-layers are formed by changing a current density by using a flame plating method on an insulating film.

U.S. Pat. No. 4,661,216 discloses an electoplating bath composition for electroplating a coating of a cobalt-nickel-iron (CoNiFe) alloy with low coercivity, high saturation magnetization (4 πMs), and 0 or slightly negative magnetization (λs) for use in thin film heads for reading and writing. The CoNiFe electroplating bath composition disclosed in U.S. Pat. No. 4,661,216 includes a stress reliving agent such as saccharin.

Japanese Unexamined Patent Publication of Tokkai No. Hei 6-346,202 or JP-A 6-346202 discloses a soft magnetic alloy having high Bs, low Hc,and high μ. According to JP-A 6-346202, essential components of this soft magnetic alloy are constituted of iron (Fe), cobalt (Co), and nickel (Ni). In the formula of $Fe_xCo_yNi_z$, the atomic ratio of each element in these essential components is expressed by $0.10 \leq x \leq 0.55$, $0.20 \leq y \leq 0.85$, $0.05 \leq z \leq 0.35$ and $x+y+z=1$. The soft magnetic alloy is substantially constituted of a face-centered cubic crystal single phase. In the case the peak intensity of the (200) plane and that of the (111) plane in the X-ray analysis are respectively defined as I(200) and I(111), $I(200)/I(111) \geq 0.25$ is regulated. Furthermore, the absolute value of the saturation nagnetostrictoin value (λs) is regulated to $5 \times 10^{-6}$ or below. In this way, the λs can substantially be regulated to zero even in the compositional range by which high Bs can be obtained.

The above-mentioned JP-B 2821456 also discloses a soft magnetic film suitable for the first and the second magnetic layer. The soft magnetic film is a Co—Ni—Fe plating film formed with a plating bath including no addition agent such as saccharin to obtain a pure film having a sulfur content of 0.1% by weight or less. Such a soft magnetic film has a magnetostrictive constant reduced up to a practical level, an extremely high saturation magnetic flux density (Bs) of 1.9–2.2 T, and an extremely small coercive force of 199 A/M or less. The soft magnetic film is called a high-Bs soft magnetic film.

However, when the first (lower) and the second (upper) magnetic layers are formed using the high-Bs soft magnetic film, problems arise as follows:

① stripping or peeling occurs in the first and the second magnetic layers;

② cracks occur in a step cover (SC) film which is a boundary face between first and second insulating layers covering the write coil: and ③ cracks occur in a frame resist on forming the high-Bs soft magnetic film, the plating film grows along the cracks, and then abnormality in shape or shape anomaly occurs in the first and the second magnetic layers.

SUMMARY OF THE INVENTION

It is therefore an object of this invention to provide a magnetic head suitable for a high recording density by resolving various problems which occur in a case where high-Bs soft magnetic films are applied to first and second magnetic layers.

It is another object of this invention to provide a manufacturing process suitable for the above-mentioned magnetic head.

It is still another object of this invention to provide a magnetic storage device with the above-mentioned magnetic head.

Other objects of this invention will become clear as the description proceeds.

The present inventors discovered that stripping or the like occur because the high-Bs soft magnetic film has a large stress of about 200 MPa and that the high-Bs soft magnetic film has an enlarged adhere force and a reduced stress by inserting a non-magnetic layer under the high-Bs soft magnetic film. This invention is made based on this knowledge.

That is, this invention improves a magnetic head comprising a substrate having a principal surface, a first magnetic layer formed on the principal surface of the substrate, a recording gap layer formed on the first magnetic layer, an insulating layer formed on the recording gap layer, a write coil enclosed with and insulated by the insulating layer, and a second magnetic layer. This improvement is that a first antistripping layer is provided under the first magnetic layer and/or that a second antistripping layer is provided under the second magnetic layer. The first antistripping layer may comprise a first conductive layer formed under the first magnetic layer and a first non-magnetic layer formed under the first conductive layer. The second antistripping layer may comprise a second conductive layer formed under the second magnetic layer and a second non-magnetic layer formed under the second conductive layer.

The conductive layer serves as an electrode on forming the magnetic layer by electroplating. By inserting the non-magnetic layer between the conductive layer and the substrate or the insulating layer, adhesion between the conductive layer and the substrate or the insulating layer is improved. By improving this adhesion, stripping of the conductive layer caused by a large stress of the magnetic layer. As a result, adhesion of the magnetic layer increases.

The non-magnetic layer may preferably comprise a lamina made of a non-magnetic material (metal) of titanium (Ti) because of large adhesion. However, the non-magnetic layer may comprise a lamina made of metal selected from the group consisting essentially of tantalum (Ta), chromium (Cr), yttrium (Y), zirconium (Zr), hafnium (Hf), vanadium (V), niobium (Nb), molybdenum (Mo), and tungsten (W). When the non-magnetic layer is made of titanium, the first non-magnetic layer may preferably have a thickness between 2 nm and 10 nm, both inclusive and the second non-magnetic layer may preferably have a thickness between 10 nm and 290 nm, both inclusive. When the non-magnetic layer is made of tantalum, the first non-magnetic layer may preferably have a thickness between 1.5 nm and 10 nm, both inclusive and the second non-magnetic layer may preferably have a thickness between 8 nm and 290 nm, both inclusive. When the non-magnetic layer is made of chromium, the first non-magnetic layer may preferably have a thickness between 2.5 nm and 10 nm, both inclusive and the second non-magnetic layer may preferably have a thickness between 12 nm and 290 nm, both inclusive. This reason will be later described. In other words, the non-magnetic layer may desirably comprise a lamina made of metal having a tensile stress.

Preferably, the magnetic layer may comprise a single-layer structure of essential elements of cobalt (Co), nickel (Ni), and iron (Fe) or may comprise a laminated structure of a first magnetic sub-layer of essential elements of cobalt (Co), nickel (Ni), and iron (Fe) and a second magnetic sub-layer of essential elements of nickel (Ni) and iron (Fe). When the magnetic layer comprises the laminated structure, the first magnetic sub-layer is disposed near to the recording gap layer. The magnetic layer (first magnetic sub-layer) of the essential elements of cobalt (Co), nickel (Ni), and iron (Fe) may preferably have a crystal structure selected from the group consisting of a face-centered cubic (fcc) structure, a body-centered cubic (bcc) structure, and a mixed crystal with a face-centered cubic (fcc) structure and a body-centered cubic (bcc) structure and may preferably have a crystal particle diameter which is not more than 20 nm. This is because such a magnetic layer becomes a high-Bs soft magnetic film.

In addition, the magnetic layer may desirably comprise a lamina selected from the group consisting essentially of cobalt-iron-nickel (CoFeNi), cobalt-iron-copper (CoFeCu), cobalt-iron-molybdenum (CoFeMo), cobalt-iron-boron (CoFeB), and cobalt-iron (CoFe). The lamina may comprise alloy or mixture. The lamina may comprise one selected from a single-layer film and a multi-layer film. The mixture further may comprise an additional alloy consisting essentially of nickel-iron (NiFe).

A combination of the insulating layer and the write coil may be made by successively laminating a first insulating layer, the write coil, and a second insulating layer, a periphery end of the second insulating layer on a side of an air bearing surface (ABS) may be close to the air bearing surface than a periphery end of the first insulating layer. In this event, inasmuch as a periphery of the second insulating layer is outside a periphery of the first insulating layer, a boundary face between the second insulating layer and the first insulating layer is not exposed to the outside. Accordingly, inasmuch as the stress of the second magnetic layer is applied to the boundary face between the second insulating layer and the first insulating layer, crack does not occur in the boundary face in question.

DESCRIPTION OF THE PREFERRED EMBODIMENT

Figure 1:
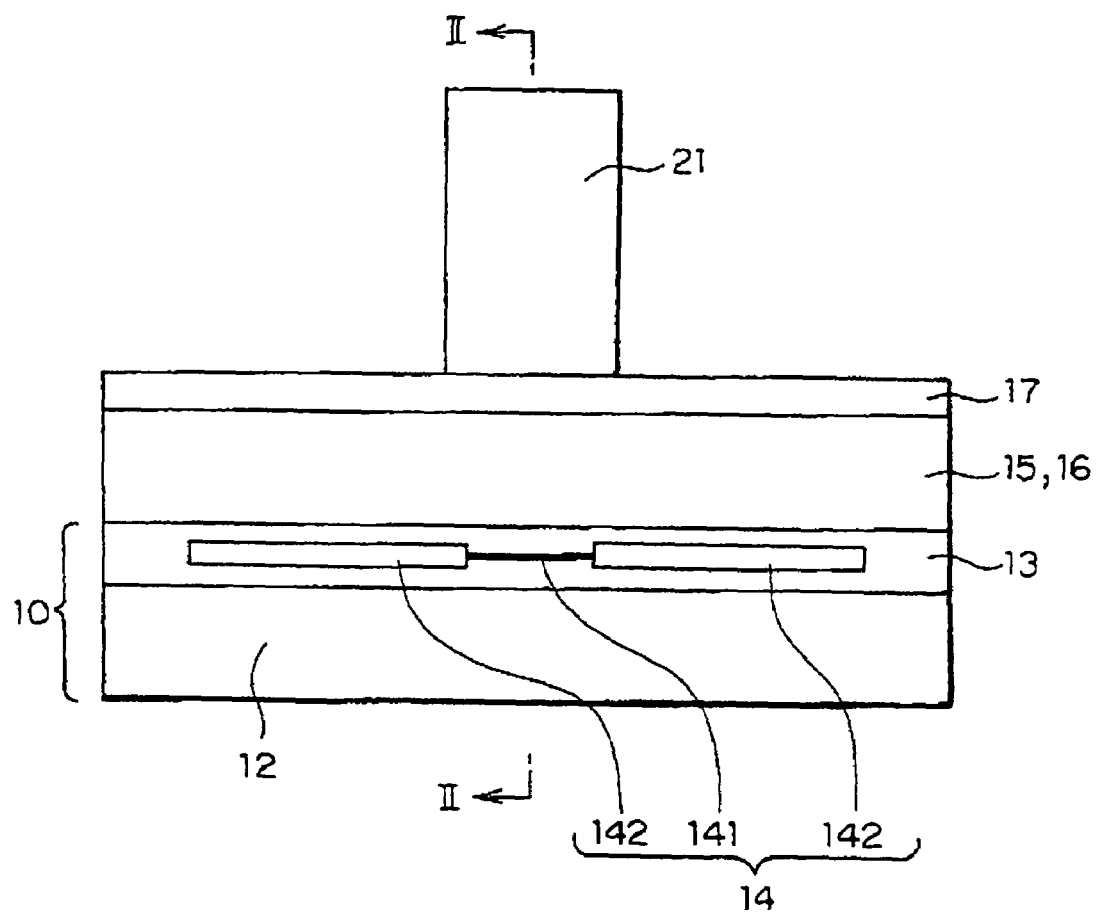
FIG. 1 is an air bearing surface (ABS) view of a conventional magnetic head.
Figure 2:
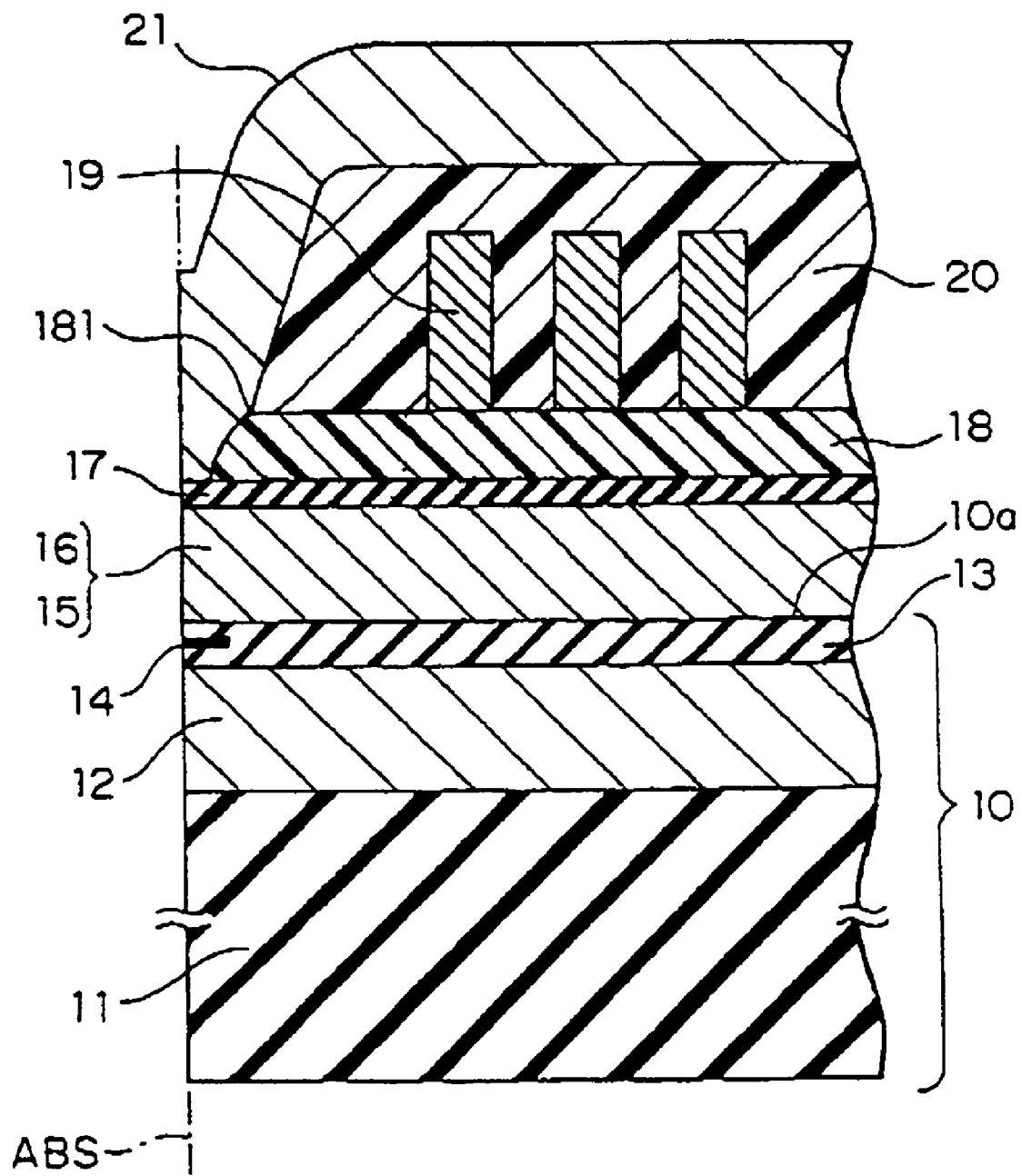
FIG. 2 is a vertical sectional view taken along the lines II—II of FIG. 1.

Referring to FIGS. 1 and 2, a conventional magnetic head will first be described in order to facilitate an understanding of the present invention. FIG. 1 is an air bearing surface (AbS) view of the conventional magnetic head. FIG. 2 is a vertical sectional view taken along the lines II—II of FIG. 1.

In the manner which will later become clear, the illustrated magnetic head is a merged GMR head which comprises a giant magnetoresistance (GMR) read head and an inductive (ID) write head. Description will be first directed to the GMR read head and will be subsequently directed to the ID write head.

The magnetic head comprises a substrate 10 having a principal surface 10a. The substrate 10 comprises a ceramic substrate 11 (which is omitted in FIG. 1) serving as a slider, a first or lower magnetic shield layer 12 formed on the ceramic substrate 11, a magnetic separation layer 13 formed on the first magnetic shield layer 12, and a GMR element 14 sandwiched in the magnetic separation layer 13. In addition, formed on the magnetic separation layer 13, a second magnetic shield layer 15 doubles as a first or lower magnetic layer 16 of the IR write head. A combination of the first magnetic shield layer 12, the magnetic separation layer 13, the GMR element 14, and the second magnetic shield layer 15 serves as the GMR read head.

As shown in FIG. 1, the GMR element 14 comprises a center area 141 and end areas 142 which are disposed in both ends of the center area 141. The center area 141 is made of a spin valve laminated structure for generating a GMR effect. The end areas 142 is for supplying an electric current and a bias magnetic field.

On the other hand, the ID read head comprises the first or lower magnetic layer 16 formed on the principal surface 10a of the substrate 10, a recording gap layer 17, a first insulating layer 18 formed on the recording gap layer 17 except for a pole tip region, a write coil 19 formed on the first insulating layer 18, a second insulating layer 20 formed on the first insulating layer 18 so as to cover the write coil 19, and a second or upper magnetic layer 21 formed on the pole chip region of the recording gap layer 17 and on the first and the second insulating layers 18 and 20. That is, the write coil 19 is enclosed with and insulated by a combination of the first and the second insulating layers 18 and 20. With this structure, information is recorded on a magnetic recording medium (not shown) by a magnetic flux which leaks in the magnetic gap layer 17 between the first and the second magnetic layers 16 and 21 magnetized by a magnetic field generated by the write coil 19.

A boundary face 181 between the first and the second insulating layers 18 and 20 is called a step cover (SC) film.

Each of the first and the second magnetic layers 16 and 21 may be made of a high-Bs soft magnetic film which is disclosed in the above-mentioned JP-B 2821456. However, following problems occur, as mentioned in the preamble of the instant specification. That is, stripping occurs in the first and the second magnetic layers 16 and 21. In addition, cracks occur in the step cover (SC) film or the boundary face 181 between the first and the second insulating layers 18 and 20. Furthermore, cracks occur in a frame resist on forming the high-Bs soft magnetic film, the plating film grows along the cracks, and then abnormality in shape occurs in the first and the second magnetic layers 16 and 21.

Figure 3:
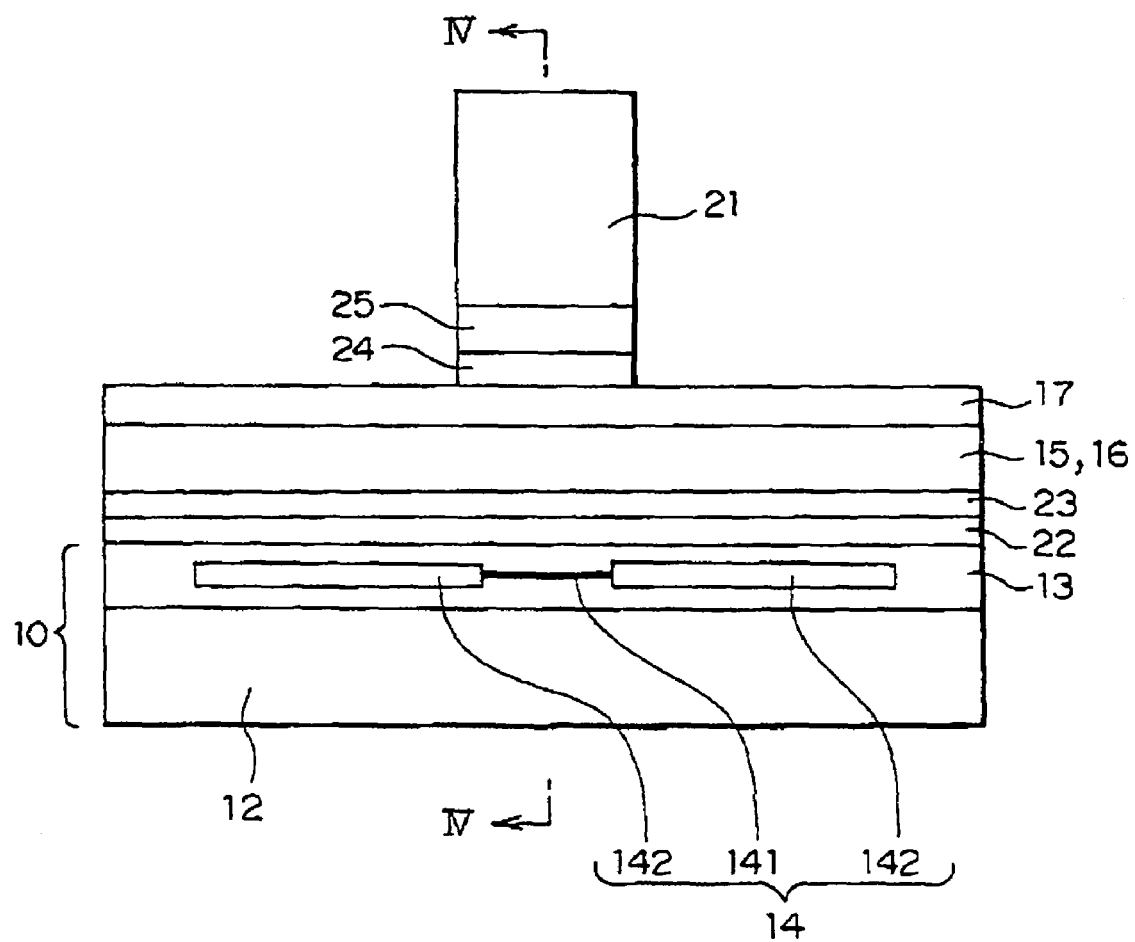
FIG. 3 is an air bearing surface (ABS) view of a magnetic head according to a first embodiment of this invention.
Figure 4:
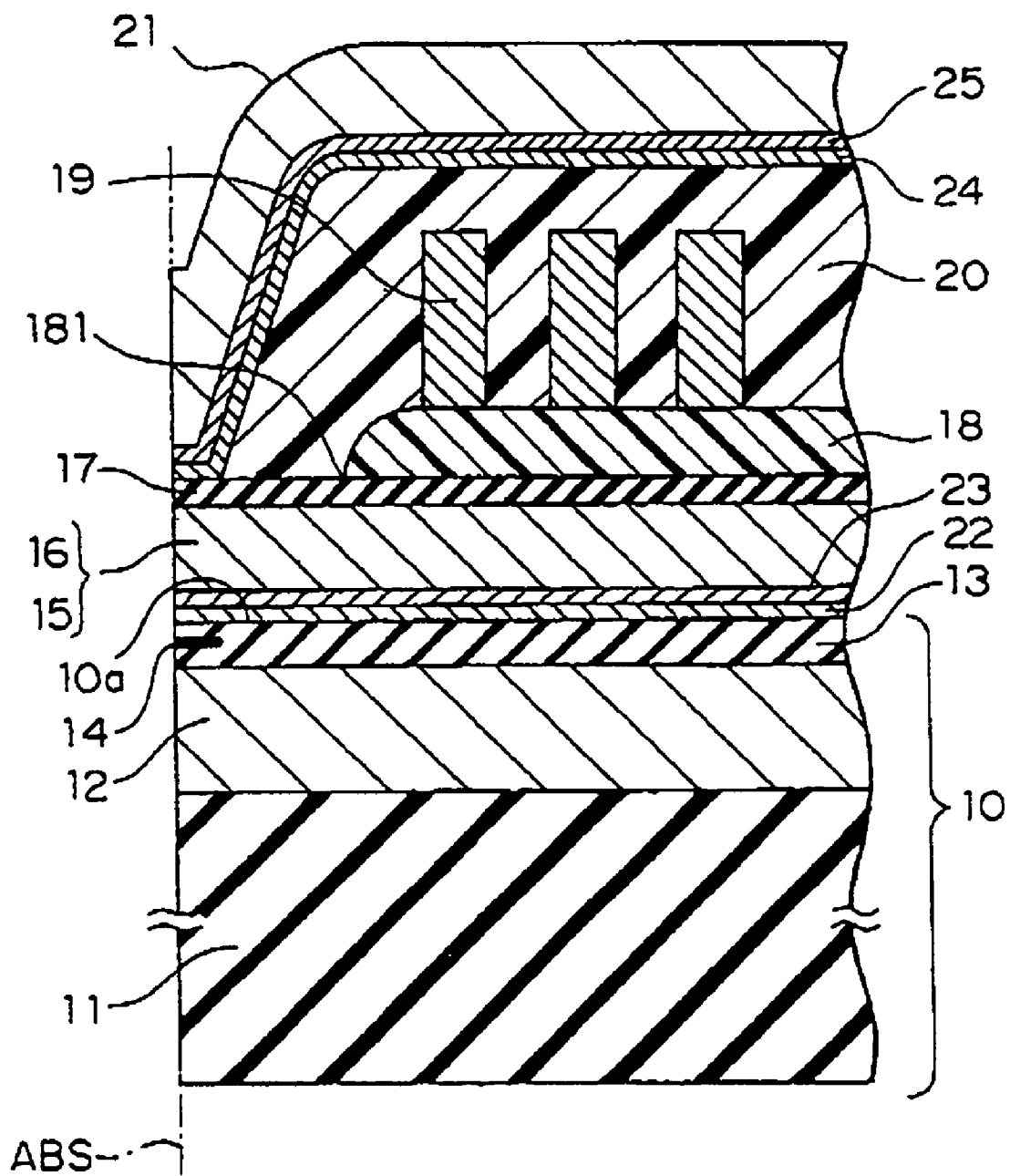
FIG. 4 is a vertical sectional view taken along the lines IV—IV of FIG. 3.

Referring to FIGS. 3 and 4, the description will proceed to a magnetic head according to a first embodiment of this invention. FIG. 3 is an air bearing surface (ABS) view of the magnetic head. FIG. 4 is a vertical sectional view taken along the lines IV—IV of FIG. 3. In FIGS. 3 and 4, similar components and part to those in FIGS. 1 and 2 are depicted by like reference numerals and description of such components and parts will be omitted.

The illustrated magnetic head is a merged GMR head which comprises a giant magnetoresistance (GMR) read head and an inductive (ID) write head.

The magnetic head comprises the ceramic substrate 11 serving as the slider. The ceramic substrate 11 is made of complex or composite ceramic consisting of alumina ($Al_2O_3$) and titanium carbide. On the ceramic substrate 11, the GMR read head having a reproducing function is formed.

The GRM read head comprises the first magnetic shield layer 12, the second magnetic shield layer 15, the magnetic separation layer 13, and the GMR element 14. Formed on the ceramic substrate, the first magnetic shield layer 12 is made of a patterned cobalt-zirconium-tantalum (CoZrTa) film. The second magnetic shielding layer 15 is made of a nickel-iron (NiFe) film which contains about 80% by weight of nickel (Ni). Disposed between the first and the second magnetic shield layers 12 and 15, the magnetic separation layer 13 is made of alumina ($Al_2O_3$). The first magnetic shield layer 12 has a thickness of 1 µm and the second magnetic shield layer 15 has a thickness of 3 µm. In addition, a gap of the first magnetic shield layer 12 and the second magnetic shield layer 15 is equal to 0.13 µm.

As shown in. FIG. 3, the GMR element 14 comprises the center area 141 and the end areas 142 which are disposed in both ends of the center area 141. The center area 141 is for sensing a magnetic field from a magnetic recording medium (not shown) while the end areas 142 is for supplying the center area 141 with an electric current and a bias magnetic field. The center area 141 is made of a laminated structure having a GMR effect which is generally called a spin valve effect. Specifically, formed on the first magnetic shield layer 12, the center area 141 comprises the laminated structure consisting of an undercoating zirconium (Zr) film having a thickness of about 3 nm, a platinum-manganese (PtMn) film having a thickness of about 20 nm, a cobalt-iron (CoFe) film having a thickness of about 2 nm, a copper (Cu) film having a thickness of about 2.1 nm, a cobalt-iron (CoFe) film having a thickness of about 0.5 nm, a nickel-iron (NiFe) film having a thickness of about 2 nm, and a zirconium (Zr) film having a thickness of about 3 nm in this order. The center area 141 has a width of 0.5 µm which defines a reproducing track width. Each end area 142 has a laminated structure which comprises a permanent magnet film and an electrode film. The permanent magnet film is, for example, a cobalt-platinum (CoPt) film having a thickness of about 20 nm. The electrode film is, for example, a gold (Au) film having a thickness of about 50 nm.

On the GMR read head, the ID write head is formed. Specifically, on the magnetic separation layer 13, the first magnetic layer 16 is formed through a first non-magnetic layer 22 and a first conductive layer 23. The first magnetic layer 16 doubles the second magnetic shield layer 15. The first non-magnetic layer 22 is made of titanium (Ti) and has a thickness of about 3 nm. The first conductive layer 23 is made of nickel-iron (NiFe) and has a thickness of about 100 nm. The first magnetic layer 16 has a laminated structure which comprises a nickel-iron (NiFe) film having a thickness of about 2.0 µm and a cobalt-nickel-iron (CoNiFe) film having a thickness of about 0.5 µm and including no stress relieving agent such as saccharin.

Inasmuch as the first magnetic layer 16 is formed on the magnetic separation layer 13 through the first non-magnetic layer 22, it is possible to improve adhesion between the first magnetic layer 16 and the magnetic separation layer 13. Accordingly, it is possible to prevent the first magnetic layer 16 from stripping caused by a stress in the cobalt-nickel-iron (CoNiFe) film which is a component of the first magnetic layer 16. Although adhesion is good when a thickness of the first non-magnetic layer 22 is 2 nm or more, the thickness of the first non-magnetic layer 22 is limited to an upper limit of 10 nm because the reproducing gap length widens too if the thickness of the first non-magnetic layer 22 is more than 10 nm. At any rate, a combination of the first non-magnetic layer 22 and the first conductive layer 23 serves as a first antistripping layer for preventing the first magnetic layer 16 from stripping.

The ID write head comprises the second magnetic shield layer 15 as the first magnetic layer 16, the recording gap layer 17 formed on the first magnetic layer 16, and the first insulating layer 18 formed on the recording gap layer 17 except for a pole tip region. The first insulating layer 18 defines a zero throat height which is well known in the art. The recording gap layer 17 has a thickness of about 0.15 μm and is made of alumina ($Al_2O_3$) The first insulating layer 18 consists of a photo-resist. In addition, on the first insulating layer 18 is formed the write coil 19 which consists of a copper (Cu) plating film. Furthermore, the second insulating layer 20 is formed on the first insulating layer 18, the write coil 19, and the recording gap layer except for an pole tip region so as to cover a peripheral part of the first insulating layer 18. The write coil 19 is insulated by the second insulating layer 20. The second insulating layer 20 consist of a photo-resist. With this structure, a boundary face 181 between the first insulating layer 18 and the second insulating layer 20 is not exposed to the side of the second magnetic layer 21. Accordingly, it is possible to prevent the boundary face 181 from cracking caused by a stress of the cobalt-nickel-iron (CoNiFe) film which includes no stress relieving agent such as saccharin and which is a component of the second magnetic layer 21.

On the pole tip region of the recording gap layer 17 and the second insulating layer 20, the second magnetic layer 21 is formed through a second non-magnetic layer 24 and a second conductive layer 25. The second non-magnetic layer 24 is made of titanium (Ti) and has a thickness of about 50 nm. The second conductive layer 25 is made of nickel-iron (NiFe) and has a thickness of about 50 nm. The second magnetic layer 21 comprises a laminated film which consists of the cobalt-nickel-iron (CoNiFe) film having a thickness of about 0.5 μm and a nickel-iron (NiFe) film having a thickness of about 2.8 μm. The second magnetic layer 21 exposes to an air bearing surface (ABS) which faces on a magnetic recording medium (not shown).

Inasmuch as the second magnetic layer 21 is formed on the second insulating layer 20 through the second non-magnetic layer 24, adhesion between the second magnetic layer 21 and the recording gap layer 17 and between the second magnetic layer 21 and the second insulating layer 20 improves and a stress of the cobalt-nickel-iron (CoNiFe) film in the second magnetic layer 21 decreases. Accordingly, it is possible to prevent the second magnetic layer 21 from stripping caused by the stress of the cobalt-nickel-iron (CoNiFe) which includes no stress relieving agent such as saccharin and which is a component of the second magnetic layer 21. At any rate, a combination of the second non-magnetic layer 24 and the second conductive layer 25 serves as a second antistripping layer for preventing the second magnetic layer 21 from stripping.

A thickness of 10 nm or more is required for the second non-magnetic layer 24 to obtain adhesion between the second insulating layer 20 and the second magnetic layer 21 and to decrease the stress of the cobalt-nickel-iron (CoNiFe) film in the second magnetic layer 21.

The second non-magnetic layer 24 acts as a part of an effective recording gap. It is assumed that the effective recording gap has a length of a, the recording gap layer 17 has a thickness of b, and the second non-magnetic layer 24 has a thickness of c. In this event, the length a of the effective recording gap is equal to a sum of the thickness b of the recording gap layer 17 and the thickness c of the second non-magnetic layer 24, namely, a=(b+c). In addition, it is desirable that the length a of the effective recording gap lies a range between 50 nm and 300 nm, both inclusive. Accordingly, the sum (b+c) lies a range between 50 nm and 300 nm, both inclusive. On the other hand, the thickness b of 10 nm or more is required for the recording gap layer 17 to electrically separate the first magnetic layer 16 from the second magnetic layer 21 at the air bearing surface (ABS). Accordingly, to satisfy there conditions, the thickness c of the second non-magnetic layer 24 has an upper limit value of 290 nm.

Figure 5:
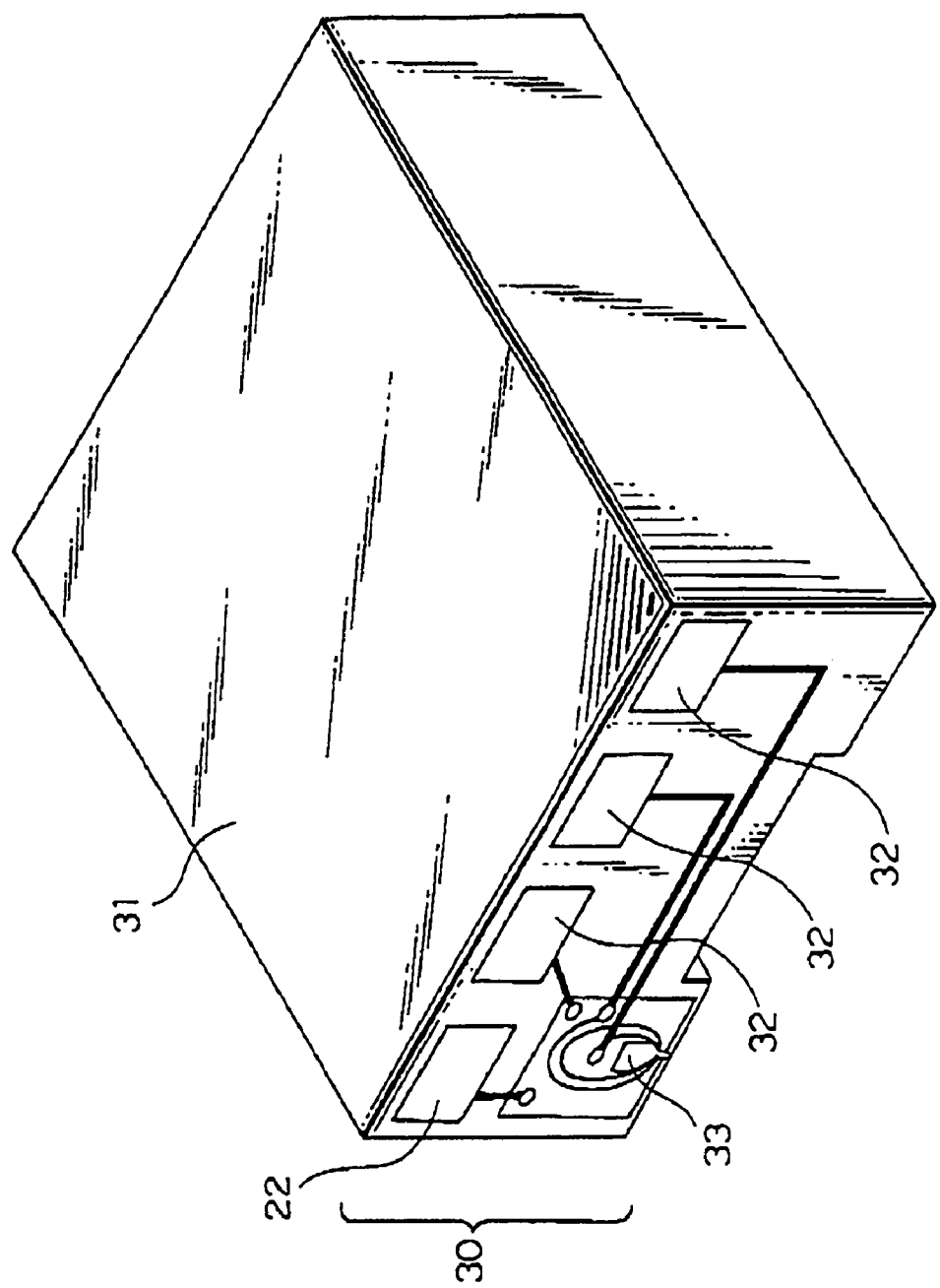
FIG. 5 is a perspective view of a magnetic head according to this invention.
Figure 6:
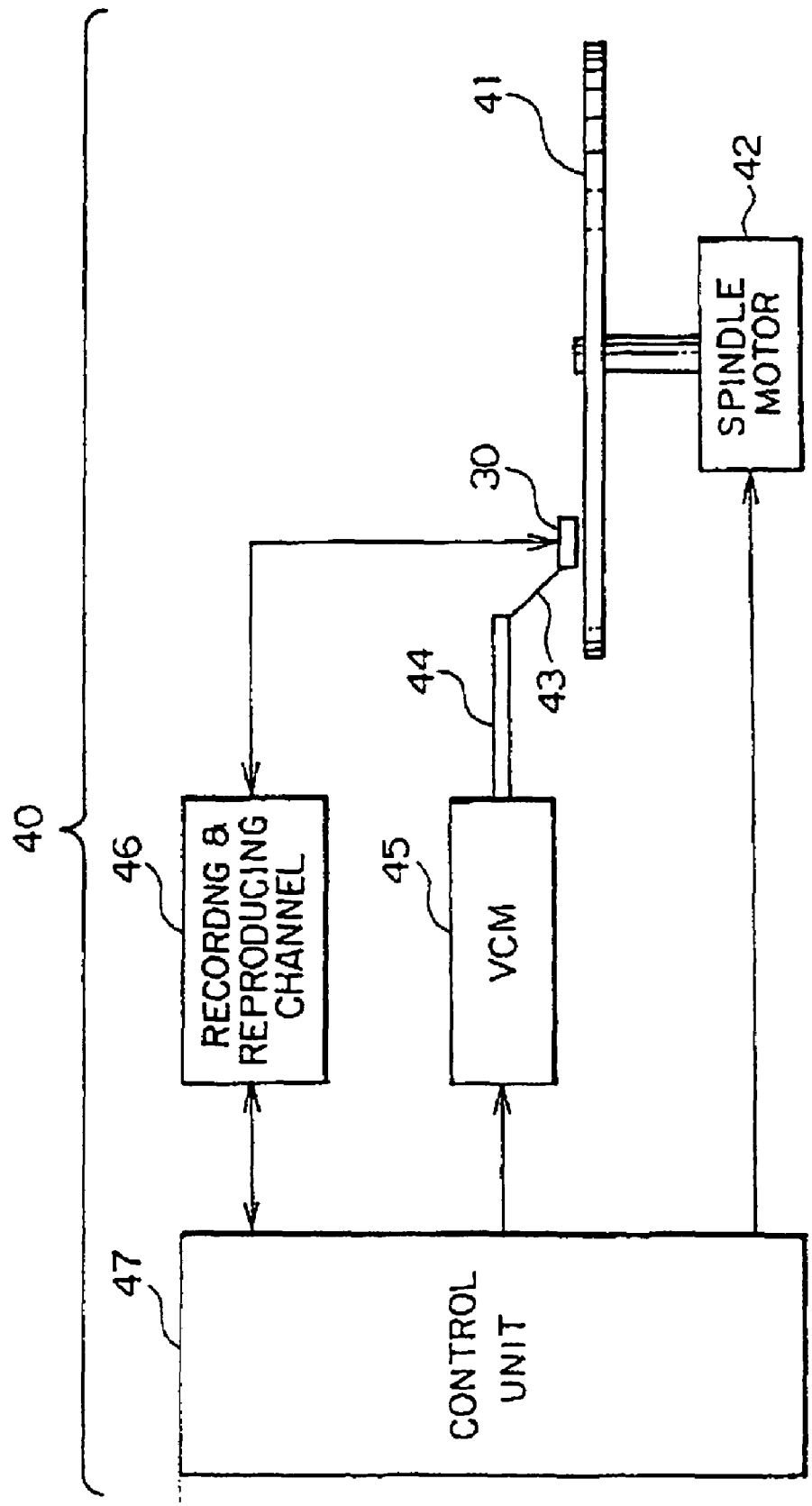
FIG. 6 is a block diagram showing the magnetic storage unit on which the magnetic head illustrated in FIG. 5 is mounted.

Referring to FIGS. 5 and 6, the description will proceed to a magnetic head according to this invention and a magnetic storage unit on which the magnetic head illustrated in FIG. 5 is mounted. FIG. 5 is a perspective view of the magnetic head according to this invention. FIG. 6 is a block diagram showing the magnetic storage unit on which the magnetic head illustrated in FIG. 5 is mounted.

As shown in FIG. 5, the magnetic head 30 comprises a slider 31, electrodes 32, and a recording and reproducing element 33. The slider 31 corresponds to the ceramic substrate 11 illustrated in FIGS. 3 and 4. The recording and reproducing element 33 corresponds to a combination of the first magnetic shielding layer 12, the magnetic separation layer 13, the GMR element 14, the second magnetic shielding layer 15 (or the first magnetic layer 16, the recording gap layer 17, the first insulating layer 18, the write coil 19, the second insulating layer 20, the second magnetic layer 21, the first non-magnetic layer 22, the first conductive layer 23, the second non-magnetic layer 24, and the second conductive layer 25 illustrated in FIGS. 3 and 4.

As shown in FIG. 6, the magnetic storage unit 40 comprises the magnetic head 30 illustrated FIG. 5, a magnetic recording medium 41 having a magnetic recording surface, and a spindle motor 32 for rotatably driving the magnetic recording medium 41. The magnetic head 30 is mounted by a suspension member 43 and an arm 44 to face to the magnetic recording surface of the magnetic recording medium 41. The magnetic head 30 is tracked on the magnetic recording medium 41 by a voice coil motor (VCM) 45. That is, the voice coil motor 45 carries out positioning of the magnetic head 30. In the magnetic storage unit 40, magnetic recording and reproducing operation is carried out by a signal which is supplied from a recording and reproducing channel 46 to the magnetic head 30. The recording and reproducing channel 46, the voice coil motor 45, and the spindle motor 32 are controlled by a control unit 47.

With this structure, it is possible to realize the magnetic storage unit 40 having a recording density of about 10 gigabits/$inch^2$ or more when the magnetic recording medium 41 has a coercive force of 278600 A/m and when a magnetic distance between the magnetic recording medium 41 and the magnetic head 30 is equal to about 35 nm.

Figure 7:
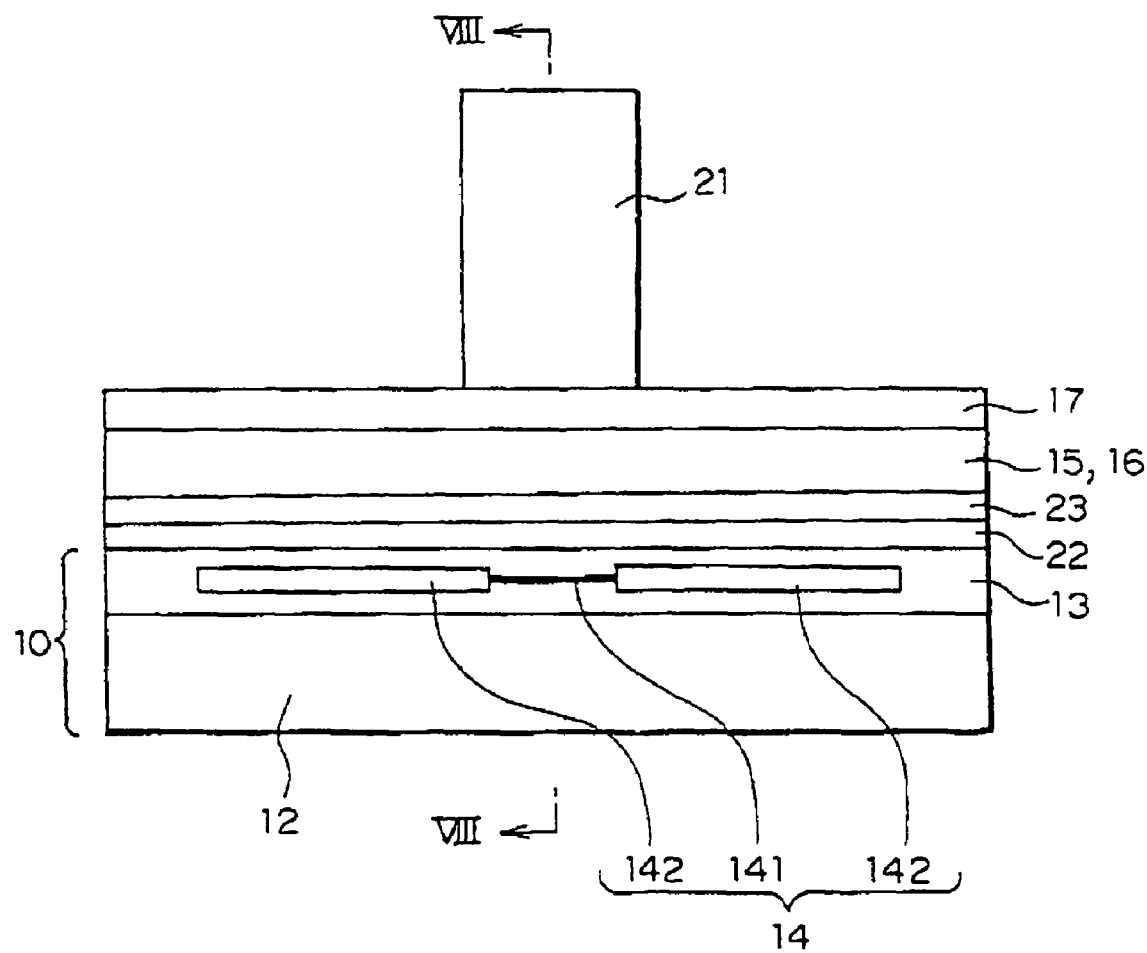
FIG. 7 is an air bearing surface (ABS) view of a magnetic head according to a second embodiment of this invention.
Figure 8:
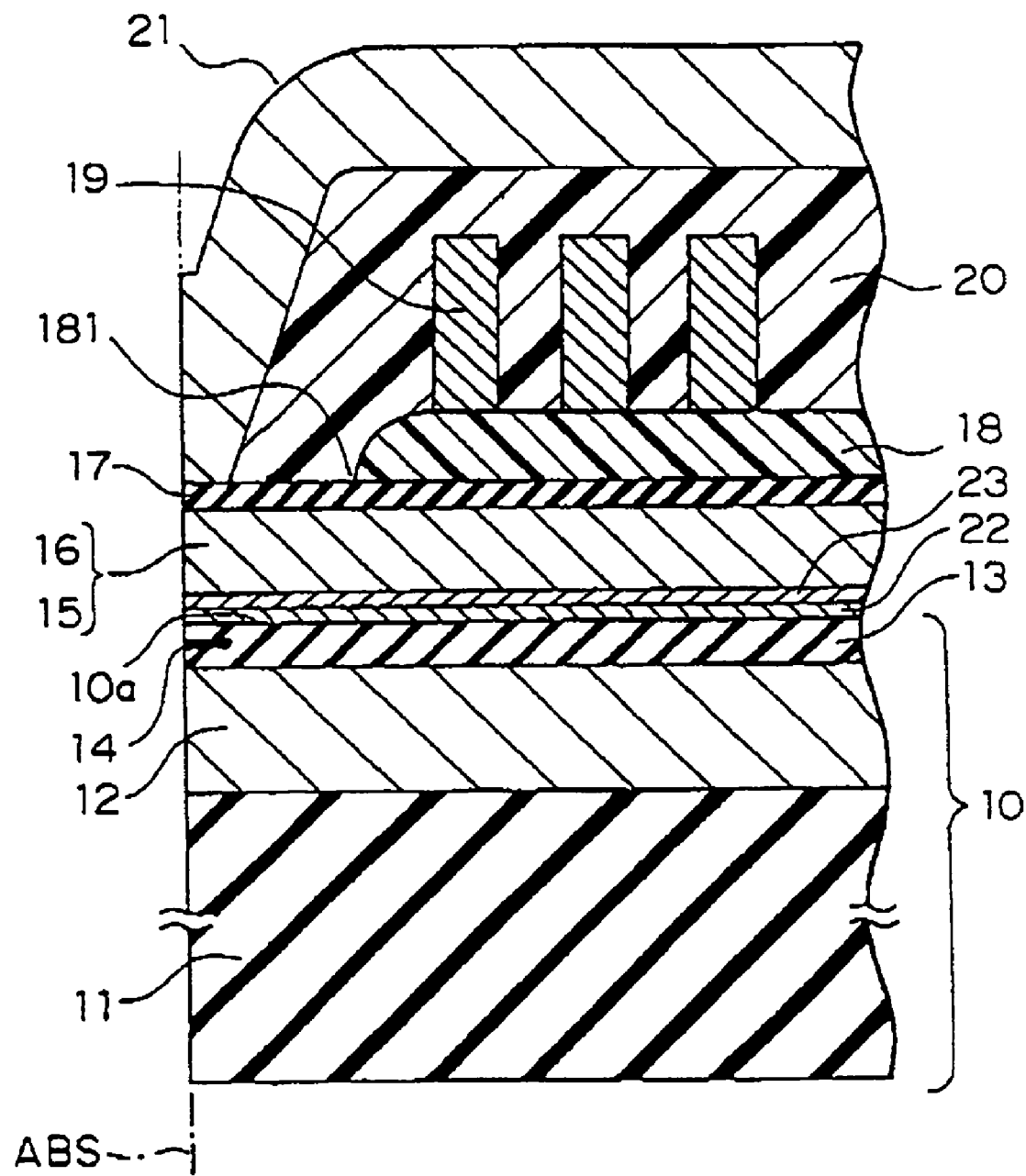
FIG. 8 is a vertical sectional view taken along the lines VIII—VIII of Fig.

Referring to FIGS. 7 and 8, the description will proceed to a magnetic head according to a second embodiment of this invention. FIG. 7 is an air bearing surface (ABS) view of the magnetic head. FIG. 8 is a vertical sectional view taken along the lines VIII—VIII of FIG. 7. In FIGS. 7 and 8, similar components and part to those in FIGS. 3 and 4 are depicted by like reference numerals and description of such components and parts will be omitted.

The illustrated magnetic head is similar in structure and operation to the magnetic head illustrated in FIGS. 3 and 4 except that the second non-magnetic layer 24 and the second conductive layer 25 are omitted from the magnetic head illustrated in FIGS. 3 and 4. In other words, the illustrated magnetic head is provided with the first non-magnetic layer 22 and the first conductive layer 23 alone. With this structure, it is possible to prevent the first magnetic layer 16 from stripping caused by a stress in the CoNiFe film which includes no stress relieving agent such as saccharin and which is a component of the first magnetic layer 16.

Figure 9:
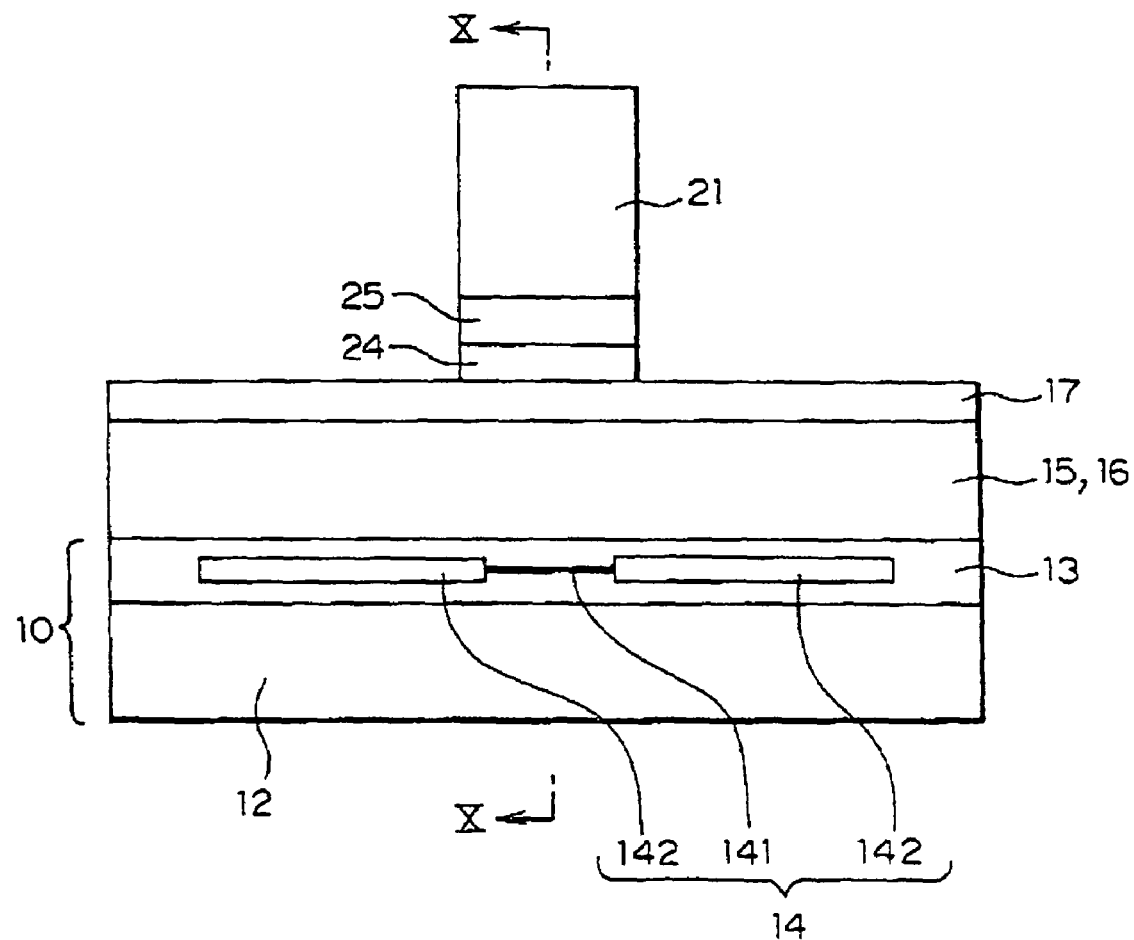
FIG. 9 is an air bearing surface (ABS) view of a magnetic head according to a third embodiment of this invention.
Figure 10:
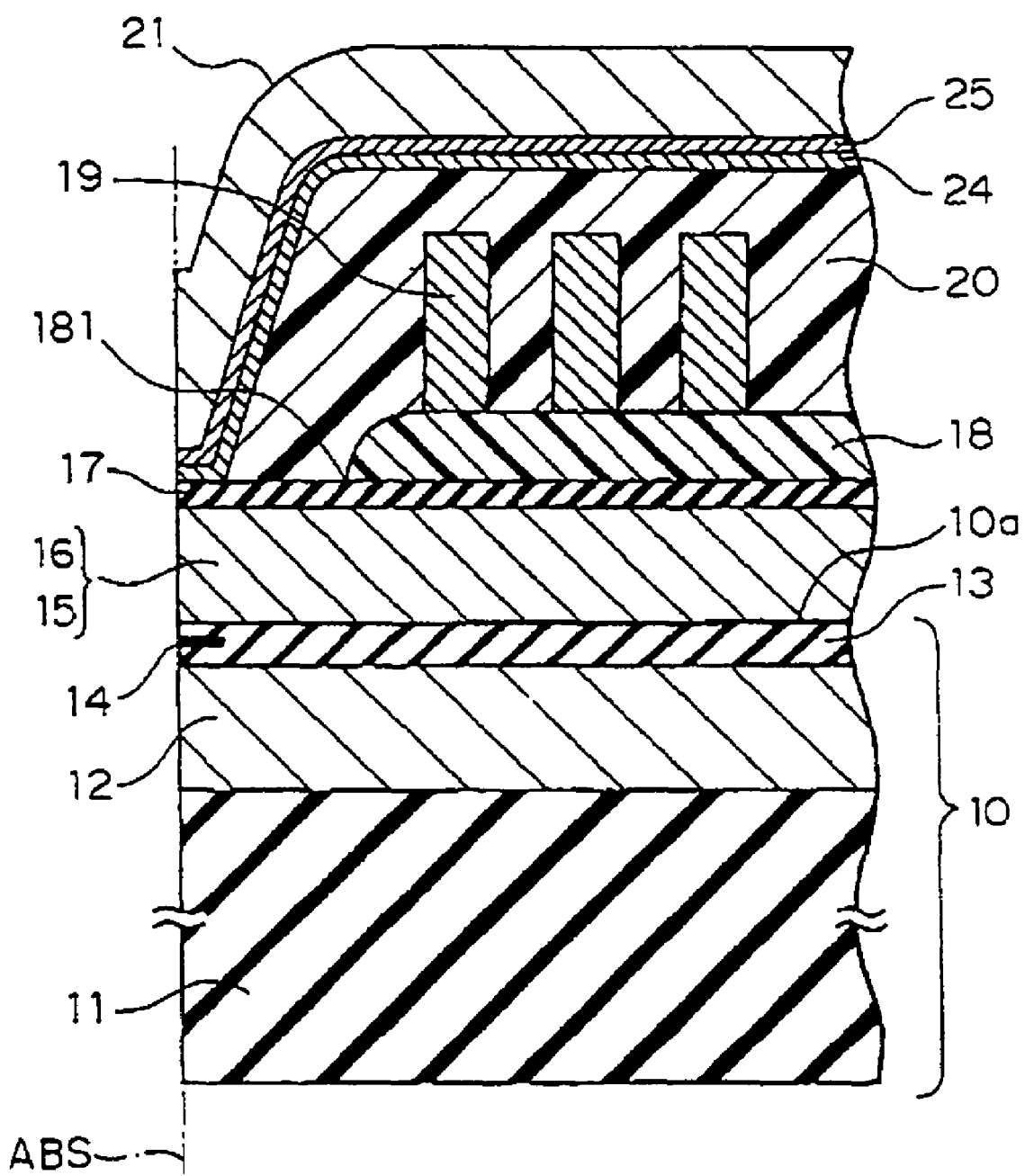
FIG. 10 is a vertical sectional view taken along the lines X—X of FIG. 9.

Referring to FIGS. 9 and 10, the description will proceed to a magnetic head according to a third embodiment of this invention. FIG. 9 is an air bearing surface (ABS) view of the magnetic head. FIG. 10 is a vertical sectional view taken along the lines X—X of FIG. 9. In FIGS. 9 and 10, similar components and part to those in FIGS. 3 and 4 are depicted by like reference numerals and description of such components and parts will be omitted.

The illustrated magnetic head is similar in structure and operation to the magnetic head illustrated in FIGS. 3 and 4 except that the first non-magnetic layer 22 and the first conductive layer 23 are omitted from the magnetic head illustrated in FIGS. 3 and 4. In other words, the illustrated magnetic head is provided with the second non-magnetic layer 24 and the second conductive layer 25 alone. With this structure, it is possible to prevent the second magnetic layer 21 from stripping caused by the stress of the CoNiFe which includes no stress relieving agent such as saccharin and which is a component of the second magnetic layer 21.

Now, description will proceed to actual examples of the magnetic head according to this invention. It is noted throughout the specification hereunder that composition of material is represented on the basis of an atomic percent (at %) and a value put in parentheses represents a thickness of a layer, a film, or a lamina.

Firstly, a wrong occurrence resist effect by the first non-magnetic layer 22 is examined in a case of using a two-layer film of nickel-iron (NiFe)/cobalt-iron-nickel (CoFeNi) as the first magnetic layer 16.

Tables 1, 2, and 3 show probability of occurrence of stripping in the first magnetic layer 16, probability of occurrence of crack in the second insulating layer 20, and probability of occurrence of shape anomaly in the first magnetic layer 16 in a case of manufacturing the magnetic head having structure illustrated in FIGS. 3 and 4 by using a lamina made of metal selected from titanium (Ti), tantalum (Ta) and chromium (Cr) as the first non-magnetic layer 22 and by changing thickness thereof. In elements used in measurement, the first magnetic layer 16 doubling as the second magnetic shield layer 15 comprises the two-layer film (which laminates CoFeNi on NiFe) made of $Ni_{80}Fe_{20}$ (1.0 μm)/$Co_{65}Fe_{23}Ni_{12}$ (1.0 μm) formed by plating with using no stress relaxation agent and the second magnetic layer 21 comprises a single-layer film made of $Co_{65}Fe_{23}Ni_{12}$ (1.4 μm) formed by plating with using no stress relaxation agent. The second non-magnetic layer 24 is made of titanium (Ti) and has a thickness of 30 nm. As result, wrong such as stripping caused by the second magnetic layer 21, occurrence of crack, and shape anomaly are not occurred. On manufacturing, following is used as each element of the magnetic head. Composition of each material described below is composition (at %) of a target for use in sputtering.

The ceramic substrate 11 comprises a substrate made of alumina titanium carbide ($Al_2O_3$—TiC) having a thickness of 1.2 mm on which alumina ($Al_2O_3$) is laminated by 3 μm. The first magnetic shield layer 12 is made of $Co_{89}Zr_4Ta_4Cr_3$ (1 μm). A vertical bias grounding layer is made of chromium (Cr) (10 nm). A vertical bias is made of $Co_{74.5}Cr_{10.5}Pt_{15}$ (16 nm). The magnetic separation layer 15 is made of alumina ($Al_2O_3$). The GMR element 15 has a laminated structure consisting of tantalum (Ta) (3 nm), $Pt_{46}Mn_{54}$ (20 nm), $Co_{90}Fe_{10}$ (3 nm), ruthenium (Ru) (0.7 nm), $Co_{90}Fe_{10}$ (3 nm), copper (Cu) (2.1 nm), $Co_{90}Fe_{10}$ (0.5 nm), $Ni_{82}Fe_{18}$ (1 nm), copper (Cu) (2 nm), and tantalum (Ta) (3 nm). The first conductive layer 23 is made of $Ni_{80}Fe_{20}$ (100 nm). The recording gap layer 17 is made of alumina ($Al_2O_3$) (0.18 μm). The write coil 19 is made of copper (Cu) (1.8 μm). The second conductive layer 25 is made of $Ni_{80}Fe_{20}$ (50 nm). The second insulating layer 20 comprises a resist.

TABLE 1

| THICKNESS OF Ti LAYER (nm) | PROBABILITY OF OCCURRENCE OF STRIPPING IN 1ST MAGNETIC LAYER (%) | PROBABILITY OF OCCURRENCE OF CRACK IN 2ND INSULATING LAYER (%) | PROBABLITY OF OCCURENCE OF SHAPE ANOMALY IN 1ST MAGNETIC LAYER (%) |
| --- | --- | --- | --- |
| 0 | 82 | 72 | 66 |
| 0.5 | 85 | 74 | 68 |
| 1.0 | 72 | 63 | 55 |
| 1.5 | 50 | 41 | 36 |
| 2.0 | 9 | 2 | 0 |
| 2.5 | 6 | 0 | 0 |
| 3.0 | 3 | 0 | 0 |
| 4.0 | 0 | 0 | 0 |
| 5.0 | 0 | 0 | 0 |
| 7.0 | 0 | 0 | 0 |
| 10.0 | 0 | 0 | 0 |
| 20.0 | 0 | 0 | 0 |

TABLE 2

| THICKNESS OF Ta LAYER (nm) | PROBABILITY OF OCCURRENCE OF STRIPPING IN 1ST MAGNETIC LAYER (%) | PROBABILITY OF OCCURRENCE OF CRACK IN 2ND INSULATING LAYER (%) | PROBABLITY OF OCCURRENCE OF SHAPE ANOMALY IN 1ST MAGNETIC LAYER (%) |
|---|---|---|---|
| 0 | 82 | 72 | 66 |
| 0.5 | 80 | 72 | 60 |
| 1.0 | 62 | 59 | 47 |
| 1.5 | 14 | 11 | 7 |
| 2.0 | 5 | 3 | 2 |
| 2.5 | 2 | 2 | 0 |
| 3.0 | 0 | 0 | 0 |
| 4.0 | 0 | 0 | 0 |
| 5.0 | 0 | 0 | 0 |
| 7.0 | 0 | 0 | 0 |
| 10.0 | 0 | 0 | 0 |
| 20.0 | 0 | 0 | 0 |

TABLE 3

| THICKNESS OF Cr LAYER (nm) | PROBABILITY OF OCCURRENCE OF STRIPPING IN 1ST MAGNETIC LAYER (%) | PROBABILITY OF OCCURRENCE OF CRACK IN 2ND INSULATING LAYER (%) | PROBABLITY OF OCCURENCE OF SHAPE ANOMALY IN 1ST MAGNETIC LAYER (%) |
|---|---|---|---|
| 0 | 82 | 72 | 66 |
| 0.5 | 79 | 71 | 61 |
| 1.0 | 72 | 64 | 59 |
| 1.5 | 64 | 58 | 49 |
| 2.0 | 59 | 53 | 46 |
| 2.5 | 12 | 9 | 7 |
| 3.0 | 7 | 4 | 3 |
| 4.0 | 4 | 1 | 1 |
| 5.0 | 0 | 0 | 0 |
| 7.0 | 0 | 0 | 0 |
| 10.0 | 0 | 0 | 0 |
| 20.0 | 0 | 0 | 0 |

In a case of using a titanium (Ti) layer as the first non-magnetic layer 22, stripping caused by the first magnetic layer 16, occurrence of crack, and shape anomaly occur at a large probability of 30% or more when the titanium (Ti) layer has a thickness of 1.5 nm or less. When the titanium (Ti) layer has a thickness of 2.0 nm or more, the probability of occurrence of respective wrongs is lowered to several % or less and the wrong occurrence resist effect caused by the first non-magnetic layer 22 made of titanium (Ti) presents.

In a case of using a tantalum (Ta) layer as the first non-magnetic layer 22, stripping caused by the first magnetic layer 16, occurrence of crack, and shape anomaly occur at a large probability of 40% or more when the tantalum (Ta) layer has a thickness of 1.0 nm or less. When the tantalum (Ta) layer has a thickness of 1.5 nm or more, the probability of occurrence of respective wrongs is lowered to some ten % or less and the wrong occurrence resist effect caused by the first non-magnetic layer 22 made of tantalum (Ta) presents.

In a case of using a chromium (Cr) layer as the first non-magnetic layer 22, stripping caused by the first magnetic layer 16, occurrence of crack, and shape anomaly occur at a large probability of 40% or more when the chromium (Cr) layer has a thickness of 2.0 nm or less. When the Ca layer has a thickness of 2.5 nm or more, the probability of occurrence of respective wrongs is lowered to some ten % or less and the wrong occurrence resist effect caused by the first non-magnetic layer 22 made of chromium (Cr) presents.

Secondary, incidence of wrong is measured by using a single-layer film of an alloy made of cobalt-iron-nickel (CoFeNi) as the first magnetic layer 16 and by manufacturing the magnetic head with composition of the alloy made of cobalt-iron-nickel (CoFeNi) changed.

Table 4 shows thickness of the first non-magnetic layer 22 made of titanium (Ti) having the thinnest thickness where each of the probability of occurrence of stripping in the first magnetic layer 16, the probability of occurrence of crack in the second insulating layer 20, and the probability of occurrence of shape anomaly in the first magnetic layer 16 in a case of using a titanium (Ti) layer as the first non-magnetic layer 22. In this event, the first magnetic layer 16 doubling as the second magnetic shield layer 15 comprises one of three types of the single-layer film made of cobalt-iron-nickel (CoFeNi) having different composition ($Co_{65}Fe_{23}Ni_{12}$, $Co_{43}Fe_{16}Ni_{41}$, $Co_{80}Fe_9Ni_{11}$) having a thickness of 2 µm each of which formed by plating with using no stress relaxation agent. In elements used measurement, the second magnetic layer 21 comprises a single-layer film made of $Co_{65}Fe_{23}Ni_{12}$ (1.4 µm) formed by plating with using no stress relaxation agent. The second non-magnetic layer 24 is made of titanium (Ti) having a thickness of 30 nm in order to resist occurrence of wrong caused by the second magnetic layer 24. As result, wrong such as stripping caused by the second magnetic layer 21, occurrence of crack, and shape anomaly is not occurred. As each element of the magnetic head, sitilar ones used in those to obtain data in Tables 1 to 3 are used.

TABLE 4

| COMPOSITION OF 1ST MAGNETIC LAYER (at %) | MINIMUM THICKNESS OF Ti LAYER WHERE PROBABILITY OF OCCURRENCE OF STRIPPING IN 1ST MAGNETIC LAYER IS LESS THAN 20% (nm) | MINIMUM THICKNESS OF Ti LAYER WHERE PROBABILITY OF OCCURRENCE OF CRACK IN 2ND INSULATING LAYER IS LESS THAN 20% (nm) | MINIUM THICKNESS OF Ti LAYER WHERE PROBABILITY OF OCCURRENCE OF SHAPE ANOMALY IN 1ST MAGNETIC LAYER IS LESS THAN 20% (nm) |
|---|---|---|---|
| $Co_{66}Fe_{23}Ni_{12}$ | 2.0 | 2.0 | 2.0 |
| $Co_{43}Fe_{15}Ni_{41}$ | 2.0 | 2.0 | 2.0 |
| $Co_{80}Fe_{9}Ni_{11}$ | 2.0 | 2.0 | 2.0 |

The thickness of the first non-magnetic layer 22 made of titanium (Ti) having the thinnest thickness where each of the probability of occurrence of stripping in the first magnetic layer 16, the probability of occurrence of crack in the second insulating layer 20, and the probability of occurrence of shape anomaly in the first magnetic layer 16 is less than 20% is 2.0 nm in the case of any composition. Difference is not present in the wrong occurrence resist effect caused by the first non-magnetic layer 22 made of titanium (Ti) although the composition of the alloy made of cobalt-iron-nickel (CoFeNi) differs from each other.

Thirdly, a wrong occurrence resist effect caused by the second non-magnetic layer 24 is examined in a case of using a two-layer film made of cobalt-iron-nickel (CoFeNi)/ nickel-iron (NiFe) as the second magnetic layer 21.

Tables 5, 6, and 7 show probability of occurrence of stripping in the second magnetic layer 21, probability of occurrence of crack in the second insulating layer 20, and probability of occurrence of shape anomaly in the second magnetic layer 21 in a case of manufacturing the magnetic head having structure illustrated in FIGS. 3 and 4 by using a lamina made of metal selected from titanium (Ti), tantalum (Ta), and chromium (Cr) as the second non-magnetic layer 24 and by changing thickness thereof. In elements used in measurement, the first magnetic layer 16 doubling as the second magnetic shield layer 15 comprises a single-layer film made of $Co65Fe_{23}Ni_{12}$ (2.0 μm) formed by plating with using no stress relaxation agent and the second magnetic layer 21 comprises a two-layer film made of $Co_{65}Fe_{23}Ni_{12}$ (0.7 μm)/$Ni_{80}Fe_{20}$ (0.7 μm) formed by plating with using no stress relaxation agent. The first non-magnetic layer 22 is made of titanium (Ti) having a thickness of 5 nm. As result, wrong such as stripping caused by the first magnetic layer 16, occurrence of crack, and shape anomaly is not occurred. On manufacturing, as each element of the magnetic head, similar ones used in those to obtain data in Tables 1 to 3 are used.

TABLE 5

| THICKNESS OF Ti LAYER (nm) | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
|---|---|---|---|
| 0 | 95 | 87 | 77 |
| 5.0 | 92 | 84 | 79 |
| 8.0 | 77 | 71 | 65 |
| 9.0 | 62 | 57 | 51 |
| 10.0 | 13 | 9 | 6 |
| 12.0 | 7 | 4 | 3 |
| 15.0 | 0 | 0 | 0 |
| 20.0 | 0 | 0 | 0 |
| 40.0 | 1 | 0 | 0 |
| 100.0 | 0 | 0 | 0 |

TABLE 6

| THICKNESS OF Ta LAYER (nm) | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
|---|---|---|---|
| 0 | 95 | 87 | 77 |
| 7.0 | 72 | 64 | 59 |
| 8.0 | 19 | 11 | 9 |

TABLE 6-continued

| THICKNESS OF Ta LAYER (nm) | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
|---|---|---|---|
| 9.0 | 7 | 4 | 1 |
| 10.0 | 3 | 2 | 1 |
| 12.0 | 1 | 0 | 0 |
| 15.0 | 0 | 0 | 0 |
| 20.0 | 0 | 0 | 0 |
| 40.0 | 1 | 1 | 1 |
| 100.0 | 0 | 0 | 0 |

TABLE 7

| THICKNESS OF Cr LAYER (nm) | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
|---|---|---|---|
| 0 | 95 | 87 | 77 |
| 5.0 | 91 | 82 | 75 |
| 8.0 | 77 | 69 | 67 |
| 9.0 | 67 | 54 | 49 |
| 10.0 | 52 | 43 | 36 |
| 12.0 | 17 | 12 | 9 |
| 15.0 | 3 | 2 | 1 |
| 20.0 | 1 | 1 | 0 |
| 40.0 | 2 | 1 | 1 |
| 100.0 | 1 | 0 | 0 |

In a case of using a titanium (Ti) layer as the second non-magnetic layer 24, stripping caused by the second magnetic layer 21, occurrence of crack, and shape anomaly occur at a large probability of 50% or more when the titanium (Ti) layer has a thickness of 9.0 nm or less. When the titanium (Ti) layer has a thickness of 10.0 nm or more, the probability of occurrence of respective wrongs is lowered to some ten % or less and the wrong occurrence resist effect caused by the second non-magnetic layer 24 made of titanium (Ti) presents.

In a case of using a tantalum (Ta) layer as the second non-magnetic layer 24, stripping caused by the second magnetic layer 21, occurrence of crack, and shape anomaly occur at a large probability of 50% or more when the tantalum (Ta) layer has a thickness of 7.0 nm or less. When the tantalum (Ta) layer has a thickness of 8.0 nm or more, the probability of occurrence of respective wrongs is lowered to some ten % or less and the wrong occurrence resist effect caused by the second non-magnetic layer 24 made of tantalum (Ta) presents.

In a case of using a chromium (Cr) layer as the second non-magnetic layer 24, stripping caused by the second magnetic layer 21, occurrence of crack, and shape anomaly occur at a large probability of 30% or more when the chromium (Cr) layer has a thickness of 10.0 nm or less. When the chromium (Cr) layer has a thickness of 12.0 nm or more, the probability of occurrence of respective wrongs is lowered to some ten % or less and the wrong occurrence resist effect caused by the second non-magnetic layer 24 made of chromium (Cr) presents.

Fourthly, incidence of wrong is measured by using a single-layer film of an alloy made of cobalt-iron-nickel (CoFeNi) as the second magnetic layer 21 and by manufacturing the magnetic head with composition of the alloy made of cobalt-iron-nickel (CoFeNi) changed.

Table 8 shows thickness of the second non-magnetic layer 24 made of titanium (Ti) having the thinnest thickness where each of the probability of occurrence of stripping in the second magnetic layer 21, the probability of occurrence of crack in the second insulating layer 20, and the probability of occurrence of shape anomaly in the second magnetic layer 21 in a case of using a titanium (Ti) layer as the second non-magnetic layer 24. In this event, the second magnetic layer 16 comprises one of three types of the single-layer film made of cobalt-iron-nickel (CoFeNi) having different composition ($Co_{65}Fe_{23}Ni_{12}$, $Co_{43}Fe_{16}Ni_{41}$, $Co_{80}Fe_{9}Ni_{11}$) having a thickness of 1.2 µm each of which formed by plating with using no stress relaxation agent. In elements used measurement, the first magnetic layer 16 doubling as the second magnetic shield layer 15 comprises a single-layer film made of $Co_{65}Fe_{23}Ni_{12}$ (2.0 µm) formed by plating with using no stress relaxation agent. The first non-magnetic layer 22 is made of titanium (Ti) having a thickness of 5 nm. As result, wrong such as stripping caused by the first magnetic layer 16, occurrence of crack, and shape anomaly is not occurred. As each element of the magnetic head, similar ones used in those to obtain data in Tables 1 to 3 are used.

TABLE 8

| COMPOSITION OF 2ND MAGNETIC LAYER (at %) | MINIMUM THICKNESS OF Ti LAYER WHERE PROBABILITY OF OCCURRENCE OF STRIPPING IN 2ND MAGNETIC LAYER IS LESS THAN 20% (nm) | MINIMUM THICKNESS OF Ti LAYER WHERE PROBABILITY OF OCCURRENCE OF CRACK IN 2ND INSULATING LAYER IS LESS THAN 20% (nm) | MINIUM THICKNESS OF Ti LAYER WHERE PROBABILITY OF OCCURRENCE OF SHAPE ANOMALY IN 2ND MAGNETIC LAYER IS LESS THAN 20% (nm) |
|---|---|---|---|
| $Co_{65}Fe_{23}Ni_{12}$ | 10.0 | 10.0 | 10.0 |
| $Co_{43}Fe_{15}Ni_{41}$ | 10.0 | 10.0 | 10.0 |
| $Co_{80}Fe_{9}Ni_{11}$ | 10.0 | 10.0 | 10.0 |

The thickness of the second non-magnetic layer 24 made of titanium (Ti) having the thinnest thickness where each of the probability of occurrence of stripping in the second magnetic layer 21, the probability of occurrence of crack in the second insulating layer 20, and the probability of occurrence of shape anomaly in the second magnetic layer 21 is less than 20% is 10.0 nm in the case of any composition. Difference is not present in the wrong occurrence resist effect caused by the second non-magnetic layer 24 made of titanium (Ti) although the composition of the alloy made of cobalt-iron-nickel (CoFeNi) differs from each other.

Fifthly, examination is made in a case of using, as the first and the second magnetic layers 16 and 21, materials except for the two-layer film made of cobalt-iron-nickel (CoFeNi) and nickel-iron (NiFe) and the single-layer film made of cobalt-iron-nickel (CoFeNi).

Tables 9, 10, 11, and 12 show probability of occurrence of stripping in the first magnetic layer 16, probability of occurrence of crack in the second insulating layer 20, and probability of occurrence of shape anomaly in the first magnetic layer 16 in a case of manufacturing the magnetic head having structure illustrated in FIGS. 3 and 4 by using, as the first non-magnetic layer 22, a lamina made of metal selected from titanium (Ti), tantalum (Ta), and chromium (Cr) each having a thickness of 5 nm and by using, as the first magnetic layer 16 doubling as the second magnetic shield layer 15, a single-layer film made of one selected from $Co_{74}Fe_{23}Cu_3$, $Co_{72}Fe_{24}Mo_4$, and $Co_{77}Fe_{19}B_4$, and $Co_{90}Fe_{10}$ formed by plating with using no stress relaxation agent, respectively. In elements used in measurement, the second magnetic layer 21 comprises a single-layer film made of $Co_{65}Fe_{23}Ni_{12}$ (1.4 μm) formed by plating with using no stress relaxation agent. In order to resist wrong occurrence caused by the second magnetic layer 21, the second non-magnetic layer 24 is made of titanium (Ti) having a thickness of 30 nm. As result, wrong such as stripping caused by the second magnetic layer 21, occurrence of crack, and shape anomaly is not occurred. As each element of the magnetic head, similar ones used in those to obtain data in Tables 1 to 3 are used.

TABLE 9

A case of the first magnetic layer 16 made of $Co_{74}Fe_{23}Cu_3$

| KIND OF 1ST NON-MAGNETIC LAYER | PROBABILITY OF OCCURRENCE OF STRIPPING IN 1ST MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 1ST MAGNETIC LAYER (%) |
|---|---|---|---|
| NONE | 72 | 62 | 56 |
| Ti (5 nm) | 3 | 2 | 2 |
| Ta (5 nm) | 0 | 0 | 0 |
| Cr (5 nm) | 7 | 4 | 3 |

TABLE 10

A case of the first magnetic layer 16 made of $Co_{72}Fe_{24}Mo_4$

| KIND OF 1ST NON-MAGNETIC LAYER | PROBABILITY OF OCCURRENCE OF STRIPPING IN 1ST MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 1ST MAGNETIC LAYER (%) |
|---|---|---|---|
| NONE | 71 | 64 | 53 |
| Ti (5 nm) | 0 | 0 | 0 |
| Ta (5 nm) | 2 | 1 | 1 |
| Cr (5 nm) | 7 | 4 | 3 |

TABLE 11

A case of the first magnetic layer 16 made of $Co_{77}Fe_{19}B_4$

| KIND OF 1ST NON-MAGNETIC LAYER | PROBABILITY OF OCCURRENCE OF STRIPPING IN 1ST MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 1ST MAGNETIC LAYER (%) |
|---|---|---|---|
| NONE | 75 | 67 | 61 |
| Ti (5 nm) | 2 | 1 | 1 |
| Ta (5 nm) | 1 | 0 | 0 |
| Cr (5 nm) | 7 | 5 | 4 |

TABLE 12

A case of the first magnetic layer 16 made of $Co_{90}Fe_{10}$

| KIND OF 1ST NON-MAGNETIC LAYER | PROBABILITY OF OCCURRENCE OF STRIPPING IN 1ST MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 1ST MAGNETIC LAYER (%) |
|---|---|---|---|
| NONE | 66 | 58 | 55 |
| Ti (5 nm) | 1 | 0 | 0 |
| Ta (5 nm) | 1 | 0 | 0 |
| Cr (5 nm) | 4 | 2 | 2 |

In each case of $Co_{74}Fe_{23}Cu_3$, $Co_{72}Fe_{24}Mo_4$, $Co_{77}Fe_{19}B_4$, and $Co_{90}Fe_{10}$, the probability of occurrence of wrong has 50% to 70% level in a case of using no fist non-magnetic layer 22 and is high probability of occurrence of wrong although it is not high in comparison with a case of the above-mentioned two-layer film made of nickel-iron (NiFe)/cobalt-iron-nickel (CoFeNi) or the above-mentioned single-layer film made of cobalt-nickel-iron (CoNiFe). However, by using, as the first non-magnetic layer 22, a lamina made of metal selected from titanium (Ti), tantalum (Ta), and chromium (Cr) of a thickness of 5 nm in any case, the probability of occurrence of wrong is lowered to several % or less. It is understood that the first non-magnetic layer 22 made of metal selected from titanium (Ti), tantalum (Ta), and chromium (Cr) has the wrong occurrence resist effect not only in the two-layer film made of nickel-iron (NiFe)/cobalt-iron-nickel (CoFeNi) or the single-layer film made of cobalt-iron-nickel (CoFeNi) but also in using any one of cobalt-iron-copper (CoFeCu), cobalt-iron-molybdenum (CoFeMo), cobalt-iron-boron (CoFeB), and cobalt-iron (CoFe).

Although examination is now not made, it seems that it has similar effect in a case of a multi-layer film obtained by combining nickel-iron (NiFe) with any one of cobalt-iron-copper (CoFeCu), cobalt-iron-molybdenum (CoFeMo), cobalt-iron-boron (CoFeB), or cobalt-iron (CoFe).

Tables 13, 14, 15, and 16 show probability of occurrence of stripping in the second magnetic layer 21, probability of occurrence of crack in the second insulating layer 20, and probability of occurrence of shape anomaly in the second magnetic layer 21 in a case of manufacturing the magnetic head having structure illustrated in FIGS. 3 and 4 by using, as the second non-magnetic layer 24, a lamina made of metal selected from titanium (Ti), tantalum (Ta), and chromium (Cr) each having a thickness of 30 nm and by using, as the second magnetic layer 21, a single-layer film made of one selected from $Co_{74}Fe_{23}Cu_3$, $Co_{72}Fe_{24}Mo_4$, $Co_{77}Fe_{19}B_4$, and $Co_{90}Fe_{10}$, respectively, each of which has a thickness of 1.4 µm and each of which is formed by plating with using no stress relaxation agent. In elements used in measurement, the first magnetic layer 16 comprises a single-layer film made of $Co_{65}Fe_{23}Ni_{12}$ (2.0 µm) formed by plating with using no stress relaxation agent. In order to resist wrong occurrence caused by the first magnetic layer 16, the first non-magnetic layer 22 made of titanium (Ti) having a thickness of 5 nm. As result, wrong such as stripping caused by the first magnetic layer 16, occurrence of crack, and shape anomaly is not occurred. As each element of the magnetic head, similar ones used in those to obtain data in Tables 1 to 3 are used.

TABLE 13

A case of the second magnetic layer 21 made of $Co_{74}Fe_{23}Cu_3$

| KIND OF 2ND NON-MAGNETIC LAYER | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
|---|---|---|---|
| NONE | 78 | 65 | 61 |
| Ti (30 nm) | 0 | 0 | 0 |

TABLE 13-continued

A case of the second magnetic layer 21 made of $Co_{74}Fe_{23}Cu_3$

| KIND OF 2ND NON-MAGNETIC LAYER | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
| --- | --- | --- | --- |
| Ta (30 nm) | 0 | 0 | 0 |
| Cr (30 nm) | 2 | 2 | 1 |

TABLE 14

A case of the second magnetic layer 21 made of $Co_{72}Fe_{24}Mo_4$

| KIND OF 2ND NON-MAGNETIC LAYER | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
| --- | --- | --- | --- |
| NONE | 74 | 63 | 54 |
| Ti (30 nm) | 2 | 2 | 1 |
| Ta (30 nm) | 0 | 0 | 0 |
| Cr (30 nm) | 9 | 8 | 6 |

TABLE 15

A case of the second magnetic layer 21 made of $Co_{77}Fe_{19}B_4$

| KIND OF 2ND NON-MAGNETIC LAYER | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
| --- | --- | --- | --- |
| NONE | 73 | 64 | 59 |
| Ti (30 nm) | 2 | 2 | 1 |
| Ta (30 nm) | 1 | 1 | 0 |
| Cr (30 nm) | 3 | 2 | 1 |

TABLE 16

A case of the second magnetic layer 21 made of $Co_{90}Fe_{10}$

| KIND OF 2ND NON-MAGNETIC LAYER | PROBABILITY OF OCCURRENCE OF STRIPPING IN 2ND MAGNETIC LAYER (%) | PROBABILITY OF OCCURRENCE OF CRACK IN 2ND INSULATING LAYER (%) | PROBABILITY OF OCCURRENCE OF SHAPE ANOMALY IN 2ND MAGNETIC LAYER (%) |
| --- | --- | --- | --- |
| NONE | 68 | 61 | 56 |
| Ti (30 nm) | 1 | 1 | 0 |
| Ta (30 nm) | 1 | 0 | 0 |
| Cr (30 nm) | 2 | 1 | 0 |

In each case of $Co_{74}Fe_{23}Cu_3$, $Co_{72}Fe_{24}MO_4$, $Co_{77}Fe_{19}B_4$, and $Co_{90}Fe_{10}$, the probability of occurrence of wrong has 50% to 70% level in a case of using no second non-magnetic layer 24 and is high probability of occurrence of wrong although it is not high in comparison with a case of the above-mentioned two-layer film made of nickel-iron (NiFe)/cobalt-iron-nickel (CoFeNi) or the above-mentioned single-layer film made of cobalt-nickel-iron (CoNiFe). However, by using, as the second non-magnetic layer 24, a lamina made of metal selected from titanium (Ti), tantalum (Ta), and chromium (Cr) of a thickness of 30 nm in any case, the probability of occurrence of wrong is lowered to several % or less. It is understood that the second non-magnetic layer 24 is made of one selected from titanium (Ti), tantalum (Ta), and chromium (Cr) has the wrong occurrence resist effect not only in the two-layer film made of nickel-iron (NiFe)/cobalt-iron-nickel (CoFeNi) or the single-layer film made of cobalt-iron-nickel (CoFeNi) but also in using any one of cobalt-iron-copper (CoFeCu), cobalt-iron-molybdenum (CoFeMo), cobalt-iron-boron (CoFeB), and cobalt-iron (CoFe).

Although examination is now not made, it seems that it has similar effect in a case of a multi-layer film obtained by combining nickel-iron (NiFe) with any one of cobalt-ironcopper (CoFeCu), cobalt-iron-molybdenum (CoFeMo), cobalt-iron-boron (CoFeB), or cobalt-iron (CoFe).

It is thought that there are two effects as the wrong resist effect in the first non-magnetic layer 22 and in the second non-magnetic layer 24. A first effect is an effect to improve adhesion between the magnetic separation layer 13 and the first conductive layer 23 or between the second insulating layer 20 and the second conductive layer 25 because the first non-magnetic layer 22 lies between the magnetic separation layer 13 and the first conductive layer 23 or the second non-magnetic layer 24 lies between the second insulating layer 20 and the second conductive layer 25. A second effect is an effect to reduce stress in the first conductive layer 23/the first magnetic layer 16 or in the second conductive layer 25/the second magnetic layer 21 because the first non-magnetic layer 22 is adjacent to the first conductive layer 23/the first magnetic layer 16 or the second non-magnetic layer 24 is adjacent to the second conductive layer 25/the second magnetic layer 21.

Sixthly, examination is made about whether the wrong occurrence resist effect is caused by an adhesion improvement effect or a stress reduction effect.

At first, the present co-inventors examined how large is the adhesion improvement effect by using the non-magnetic layer. A lamina made of metal selected from titanium (Ti), tantalum (Ta), and chromium (Cr) having a thickness of 10 nm is formed on a glass substrate as a non-magnetic layer by sputtering, a layer made of $Ni_{80}Fe_{20}$ having a thickness of 100 nm is formed on the non-magnetic layer as a conductive layer by sputtering, and a layer made of $Co_{65}Fe_{23}Ni_{12}$ having a thickness of 2 μm is formed on the conductive layer as a magnetic layer by plating using a stress relaxation agent. In order to make a comparison, a sample with no non-magnetic layer is made. A reason that the stress relaxation agent is used on making the magnetic layer by plating which is different from an actual process is that stripping of the magnetic layer instantly occurs in a case that the non-magnetic layer is not formed if the stress relaxation agent is not used and it is therefor impossible to measure adhesion of a compared sample.

For each of four samples made in the above-mentioned manner, adhesion is measured by using an acoustic emission method. The acoustic emission method is a method comprising the steps of applying warp stress to a substrate on which a stress measured film is formed and of detecting, as adhesion, a stress at which separation occurs by detecting the separation of the film from the substrate by sound. Although the separation of the film caused by applying of the stress occurs in a width of a level of stress, the adhesion is herein defined as the stress when the separation occurs most frequently. The adhesion in this case is shown in Table 17.

TABLE 17

| | ADHESION (GPa) |
|---|---|
| No non-magnetic layer | 9 |
| Ti (10 nm) | 58 |
| Ta (10 nm) | 62 |
| Cr (10 nm) | 41 |

In case of using no non-magnetic layer, the adhesion is 9 GPa and is small. In comparison with this, in a case of using a lamina made of metal selected from titanium (Ti), tantalum (Ta), and chromium (Cr) as the non-magnetic layer, the adhesion is drastically large. Among three types of the non-magnetic layer, the adhesion is about same level in titanium (Ti) and tantalum (Ta) and the adhesion in chromium (Cr) is smaller than that by little.

Although a portion corresponding to the substrate in this experimentation is made of a material except for the glass such as the magnetic separation layer 13 or the second insulating layer 20, it seems that the adhesion improvement effect caused by presence of the non-magnetic layer is present in such a case.

Subsequently, the present co-inventors examines the stress reduction effect caused by use of the non-magnetic layer. A lamina made of metal selected from titanium (Ti), tantalum (Ta), and chromium (Cr) having a thickness of 10 nm is formed on a substrate having a known amount of warp as a non-magnetic layer by sputtering, a layer made of $Ni_{80}Fe_{20}$ having a thickness of 100 nm is formed on the non-magnetic layer as a conductive layer by sputtering, and a layer made of $Co_{65}Fe_{23}Ni_{12}$ having a thickness of 0.3 μm is formed on the conductive layer as a magnetic layer by plating with no stress relaxation agent. In order to make a comparison, a sample with no non-magnetic layer is formed. A reason that the magnetic layer has a thin thickness to 0.3 μm which is different from an actual process is that separation of the magnetic immediately occurs in a case of forming no non-magnetic layer if a thickness of the magnetic layer is thick and it is therefore impossible to measure the adhesion of a compared sample.

For four types of samples made in the manner which is described above, the amount of warp in a Si substrate is measured to calculate stress in the layer. Measured results are shown Table 18.

TABLE 18

| | INTERNAL STRESS (MPa) |
|---|---|
| No non-magnetic layer | 2560 |
| Ti (10 nm) | 1250 |
| Ta (10 nm) | 900 |
| Cr (10 nm) | 750 |

In a case of using no non-magnetic layer, the interval stress is equal to 2560 MPa and is large. In comparison with this, in a case of using a lamina made of metal selected from titanium (Ti), tantalum (Ta), and chromium (Cr) as the non-magnetic layer, the internal stress is drastically decreased. It seems that titanium (Ti) and tantalum (Ta) have an effect so as to decrease the internal stress in a cobalt-iron-nickel (CoFeNi) plating layer formed thereon. Among three types of non-magnetic layers, the internal stress becomes small in order to titanium (Ti), tantalum (Ta), and chromium (Cr).

In the manner in the actual magnetic head as understood from that there is a little wrong occurrence in chromium (Cr) in comparison with that there is no wrong occurrence in tantalum (Ta) and titanium (Ti) when the first non-magnetic layer has a thickness of 4 nm in a case of comparing, for example, Tables 1, 2, and 3, it tends to have a larger wrong occurrence resist effect in a case of using a lamina made of metal selected from tantalum (Ta) and titanium (Ti) as the first and the second non-magnetic layers 22 and 24 in comparison with a case of using a lamina made of chromium (Cr) as the first and the second non-magnetic layers 22 and 24. Although, from Table 18, titanium (Ti) and tantalum (Ta) have a smaller stress reduction effect in comparison with chromium (Cr), titanium (Ti) and tantalum (Ta) have a larger adhesion improvement effect in comparison with chromium (Cr) in the manner which is understood from Table 17. As a result of addition of the two effects, it seems that titanium (Ti) and tantalum (Ta) have an excellent wrong occurrence resist effect more than chromium (Cr).

In addition, the present co-inventors considered that it seems that one of reasons for reduction of the stress in the magnetic layer by using a film made of one selected from titanium (Ti), tantalum (Ta), and chromium (Cr) as the non-magnetic layer may be an effect caused by addition of stresses in the non-magnetic layer, in the conductive layer, and in the magnetic layer. In order to check this, the present co-inventors measured stress in a single-layer film made of metal selected from titanium (Ti), tantalum (Ta), and chromium (Cr). Table 19 shows internal stress in the single-layer film made of metal selected from titanium (Ti), tantalum (Ta), and chromium (Cr) in a case where its thickness is equal to 50 nm.

TABLE 19

|  | INTENAL STRESS (MPa) |
| --- | --- |
| Ti (50 nm) | −210 |
| Ta (50 nm) | −530 |
| Cr (50 nm) | −420 |

In a case of each of titanium (Ti), tantalum (Ta), and chromium (Cr), the internal stress has a negative (minus) value. Accordingly, in a total of the non-magnetic layer, the conductive layer, and the magnetic layer, it is anticipated that a total stress value obtained by adding respective stress values may become smaller in each case than that in a case of no non-magnetic layer and matches with a tendency of the results shown in Table 18. While negative stress values in the single-layer film are, in descending order, tantalum (Ta), chromium (Cr), and titanium (Ti), namely, Ta>Cr>Ti, total stress values in the non-magnetic layer, the conductive layer, and the magnetic layer are, in descending order, titanium (Ti), tantalum (Ta), and chromium (Cr), namely, Ti>Ta>Cr.

Accordingly, larger ones of the negative stress in the single-layer film are not always smaller ones of the total stress values. This means that a reason that the non-magnetic layer can reduce the stress of the magnetic layer is not always that the negative stress in the single-layer of the non-magnetic layer is merely added. A future problem is to examine what is this reason.

It is understood that to use, as the non-magnetic layer, a material (metal) having the negative stress value has an effect on reduction of the total stress value as shown in data of Tables 18 and 19. Accordingly, the stress relaxation effect for the magnetic layer may be expected in a case of using, as the non-magnetic layer, a single-layer film made of a material (metal) having the negative stress although the material (metal) is a material (metal) except for titanium (Ti), tantalum (Ta), and chromium (Cr). Thereupon, as regards several types of material (metal), the present co-inventors formed a single-layer film having a thickness of 50 nm on a glass substrate and measured stress of the single-layer film. As regards the materials (metals) having the negative stress value there among, the present co-inventors measured adhesion of the single-layer film having the thickness of 50 nm formed on the glass substrate using an acoustic emission method and obtained measured values shown in Table 20.

TABLE 20

| TYPE OF MATERIAL | INTERNAL STRESS (MPa) | ADHESION (GPa) |
| --- | --- | --- |
| Y | −350 | 32 |
| Zr | −320 | 33 |
| Hf | −230 | 34 |
| V | −390 | 38 |
| Nb | −280 | 36 |
| Mo | −370 | 31 |
| W | −280 | 36 |
| Mn | −220 | 2 |
| Re | −150 | 1 |

In a case of any material, an effect for reducing a total stress in the magnetic layer may be expected because any material (metal) has the internal stress of a negative value. However, inasmuch as manganese (Mn) and rhenium (Re) have the adhesion less than 10 GPa although its film is formed on a clean glass substrate, the wrong occurrence resist effect cannot be expected in a state where the magnetic head is actually manufactured. Inasmuch as yttrium (Y), zirconium (Zr), hafnium (Hf), vanadium (V), niobium (Nb), molybdenum (Mo), and wolfram (tungsten) (W) have adhesion of a level of 30 GPa although its adhesion is not higher than that in titanium (Ti), tantalum (Ta), and chromium (Cr), they are likely candidates of the material (metal) for the first and the second non-magnetic layers 22 and 24 if they are excellent in corrosion resistance and in compatibility of a head manufacturing process.

While this invention has thus far been described in conjunction with few preferred embodiments thereof, it will now be readily possible for those skilled in the art to put this invention into various other manners. For example, the magnetic layer (first magnetic sub-layer) comprising the essential elements of cobalt (Co), nickel (Ni), and iron (Fe) may have a crystal structure selected from the group consisting of a face-centered cubic (fcc) structure, a body-centered cubic (bcc) structure, and a mixed crystal with a face-centered cubic (fcc) structure and a body-centered cubic (bcc) structure. The magnetic layer (first magnetic sub-layer) comprising the essential elements of cobalt (Co), nickel (Ni), and iron (Fe) may have a crystal particle diameter which is not more than 20 nm.

What is claimed is:

1. A magnetic head comprising:
a substrate having a principal surface;
a first magnetic layer formed on said substrate;
a recording gap layer formed on said first magnetic layer;
an insulating layer formed on said recording gap layer except for a pole tip region;
a write coil enclosed with and insulated by said insulating layer;
an antistripping layer formed on said insulating layer and on the pole tip region of said recording gap layer; and
a second magnetic layer formed on said antistripping layer;
wherein said antistripping layer comprises a non-magnetic layer formed on said insulating layer and on the pole tip region of said recording gap layer; and
wherein said non-magnetic layer is made of a non-magnetic material of one of titanium (Ti) and tantalum (Ta).

2. A magnetic head as claimed in claim 1, wherein said antistripping layer further comprises:

a conductive layer formed on said non-magnetic layer, said second magnetic layer being formed on said conductive layer.

3. A magnetic head as claimed in claim 1, wherein said non-magnetic layer comprises a lamina made of metal selected from the group consisting essentially of titanium (Ti), tantalum (Ta), chromium (Cr), yttrium (Y), zirconium (Zr), hafnium (Hf), vanadium (V), niobium (Nb), molybdenum (Mo), and tungsten (W).

4. A magnetic head as claimed in claim 3, wherein said lamina comprises one selected from a single-layer film, a multi-layer film, and an alloy film.

5. A magnetic head as claimed in claim 1, wherein said non-magnetic layer is made of the non-magnetic material of titanium (Ti), said non-magnetic layer having a thickness between 10 nm and 290 nm, both inclusive.

6. A magnetic head as claimed in claim 1, wherein said non-magnetic layer is made of the non-magnetic material of tantalum (Ta), said non-magnetic layer having a thickness between 8 nm and 290 nm, both inclusive.

7. A magnetic head as claimed in claim 1, wherein said non-magnetic layer is further made of a further non-magnetic material of chromium (Cr), said non-magnetic layer having a thickness between 12 nm and 290 nm, both inclusive.

8. A magnetic head as claimed in claim 1, wherein said non-magnetic layer comprises a lamina made of metal having a tensile stress.

9. A magnetic head as claimed in claim 8, wherein said lamina comprises one selected from a single-layer film, a multi-layer film, and an alloy film.

10. A magnetic head as claimed in claim 1, wherein said first magnetic layers comprise a lamina selected from the group consisting essentially of cobalt-iron-nickel (CoFeNi), cobalt-iron-copper (CoFeCu), cobalt-iron-molybdenum (CoFeMo), cobalt-iron-boron (CoFeB), and cobalt-iron (CoFe).

11. A magnetic head as claimed in claim 10, wherein said lamina comprises an alloy.

12. A magnetic head as claimed in claim 10, wherein said lamina comprises one selected from a single-layer film and a multi-layer film.

13. A magnetic head as claimed in claim 10, wherein said lamina comprises a mixture of at least two selected from the group consisting essentially of cobalt-iron-nickel (CoFeNi), cobalt-iron-copper (CoFeCu), cobalt-iron-molybdenum (CoFeMo), cobalt-iron-boron (CoFeB), and cobalt-iron (CoFe).

14. A magnetic head as claimed in claim 13, wherein said mixture further comprises an additional alloy consisting essentially of nickel-iron (NiFe).

15. A magnetic head as claimed in claim 1, wherein said second magnetic layer comprises essential elements of cobalt (Co), nickel (Ni), and iron (Fe).

16. A magnetic head as claimed in claim 15, wherein said second magnetic layer has a crystal structure of a face-centered cubic (fcc) structure.

17. A magnetic head as claimed in claim 15, wherein said second magnetic layer has a crystal structure of a body-centered cubic (bcc) structure.

18. A magnetic head as claimed in claim 15, wherein said second magnetic layer has a crystal structure of a mixed crystal with a face-centered cubic (fcc) structure and a body-centered cubic (bcc) structure.

19. A magnetic head as claimed in claim 15, wherein said second magnetic layer has a crystal particle diameter which is not more than 20 nm.

20. A magnetic storage unit comprising a magnetic head as claimed in claim 15 and a magnetic recording medium which has a coercive force of 278600 A/m or more and which has a recording density of 10 gigabits/inch$^2$ or more.

21. A magnetic head as claimed in claim 1, wherein said second magnetic layer comprises a laminated structure of a first magnetic sub-layer comprising essential elements of cobalt (Co), nickel (Ni), and iron (Fe) and a second magnetic sub-layer comprising essential elements of nickel (Ni) and iron (Fe), said first magnetic sub-layer being disposed near to said recording gap layer.

22. A magnetic head as claimed in claim 21, wherein said first magnetic sub-layer has a crystal structure of a face-centered cubic (fcc) structure.

23. A magnetic head as claimed in claim 21, wherein said first magnetic sub-layer has a crystal structure of a body-centered cubic (bcc) structure.

24. A magnetic head as claimed in claim 21, wherein said first magnetic sub-layer has a crystal structure of a mixed crystal with a face-centered cubic (fcc) structure and a body-centered cubic (bcc) structure.

25. A magnetic head as claimed in claim 21, wherein said first magnetic sub-layer has a crystal particle diameter which is not more than 20 nm.

26. A magnetic head as claimed in claim 1, wherein a combination of said insulating layer and said write coil is made by successively laminating a first insulating layer, said write coil, and a second insulating layer on said recording gap layer, said second insulating layer having a periphery end on a side of an air bearing surface (ABS) that is close to said air bearing surface than a periphery end of said first insulating layer.

27. A magnetic storage unit comprising a magnetic head as claimed in claim 26 and a magnetic recording medium which has a coercive force of 278600 A/m or more and which has a recording density of 10 gigabits/inch$^2$ or more.

28. A magnetic head as claimed in claim 1, wherein said substrate comprises:
an insulating substrate having a principal surface;
a first magnetic shield layer formed on the principal surface of said insulating substrate;
a magnetic separation layer formed on said first magnetic shield layer, said magnetic separation layer being made of an insulator; and
a magneto-resistive effective element sandwiched in said magnetic separation layer, said first magnetic layer being formed on said magnetic separation layer, said first magnetic layer doubling as a second magnetic shield layer.

29. A magnetic storage unit comprising a magnetic head as claimed in claim 28 and a magnetic recording medium which has a coercive force of 278600 A/m or more and which has a recording density of 10 gigabits/inch$^2$ or more.

30. A magnetic storage unit comprising a magnetic head as claimed in claim 1 and a magnetic recording medium which has a coercive force of 278600 A/m or more and which has a recording density of 10 gigabits/inch$^2$ or more.

31. A magnetic storage unit comprising a magnetic head as claimed in claim 2 and a magnetic recording medium which has a coercive force of 278600 A/m or more and which has a recording density of 10 gigabits/inch$^2$ or more.

* * * * *